(12) United States Patent
Sakai et al.

(10) Patent No.: US 10,782,788 B2
(45) Date of Patent: *Sep. 22, 2020

(54) GESTURE CONTROLLED COMMUNICATION

(71) Applicant: Saturn Licensing LLC, New York, NY (US)

(72) Inventors: Yusuke Sakai, Kanagawa (JP); Masao Kondo, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,618

(22) Filed: Apr. 26, 2016

(65) Prior Publication Data

US 2016/0239098 A1  Aug. 18, 2016

Related U.S. Application Data

(63) Continuation of application No. 13/232,406, filed on Sep. 14, 2011, now Pat. No. 9,360,931.

(30) Foreign Application Priority Data

Sep. 21, 2010 (JP) ................. P2010-210778

(51) Int. Cl.
    *G06F 3/01* (2006.01)
    *G06K 9/00* (2006.01)
    *H04N 7/14* (2006.01)

(52) U.S. Cl.
    CPC .............. *G06F 3/017* (2013.01); *G06F 3/011* (2013.01); *G06K 9/00268* (2013.01);
    (Continued)

(58) Field of Classification Search
    CPC ......... G06F 3/017; G06F 3/011; H04N 7/147; G06K 9/00268; G06K 9/00355; A63F 2300/60; A63F 2300/1093
    See application file for complete search history.

(56) References Cited

U.S. PATENT DOCUMENTS 6,111,580 A * 8/2000 Kazama .................. G06F 3/017
                                                         340/575
7,071,914 B1   7/2006 Marks
(Continued)

FOREIGN PATENT DOCUMENTS

| JP | 2005-031799 A | 2/2005 |
| WO | 2005003948 A1 | 1/2005 |
| WO | 2010087796 A1 | 8/2010 |

OTHER PUBLICATIONS

Dalal U.S. Appl. No. 61/353,965, filed Jun. 11, 2010.
(Continued)

*Primary Examiner* — Stephen S Hong
*Assistant Examiner* — Ahamed I Nazar
(74) *Attorney, Agent, or Firm* — Lerner, David, Littenberg, Krumholz & Mentlik, LLP

(57) ABSTRACT

A processing device, server, and method are provided. According to some illustrative embodiments, the device and method are implemented by detecting a face region of an image, setting at least one action region according to the position of the face region, comparing image data corresponding to the at least one action region to detection information for purposes of determining whether or not a predetermined action has been performed, and executing predetermined processing based on cooperation control information when it is determined that the predetermined action has been performed and the cooperation control information is received.

29 Claims, 17 Drawing Sheets

(52) U.S. Cl.
CPC ......... *G06K 9/00355* (2013.01); *H04N 7/147* (2013.01); *A63F 2300/1093* (2013.01); *A63F 2300/60* (2013.01)

(56) References Cited

U.S. PATENT DOCUMENTS

| | | | |
|---|---|---|---|
| 7,535,919 B2 | 5/2009 | Cho et al. | |
| 7,595,809 B2 | 9/2009 | Widdowson | |
| 8,063,938 B2 | 11/2011 | Ueki | |
| 8,204,311 B2 | 6/2012 | Kim et al. | |
| 8,264,522 B2 | 9/2012 | Martin et al. | |
| 2003/0112259 A1* | 6/2003 | Kinjo | H04N 1/42 715/700 |
| 2005/0084141 A1* | 4/2005 | Kato | G06K 9/00234 382/118 |
| 2006/0023949 A1 | 2/2006 | Saito | |
| 2006/0184800 A1 | 8/2006 | Rosenberg | |
| 2008/0019589 A1 | 1/2008 | Yoon et al. | |
| 2009/0079813 A1* | 3/2009 | Hildreth | H04N 7/147 348/14.03 |
| 2009/0100383 A1 | 4/2009 | Sunday et al. | |
| 2009/0153366 A1* | 6/2009 | Im | G06F 3/017 341/20 |
| 2009/0160808 A1 | 6/2009 | Wu et al. | |
| 2009/0217211 A1* | 8/2009 | Hildreth | G06F 3/017 715/863 |
| 2009/0324008 A1* | 12/2009 | Kongqiao | G06T 7/11 382/103 |
| 2011/0001813 A1* | 1/2011 | Kim | G06K 9/00355 348/77 |
| 2011/0012921 A1 | 1/2011 | Cholewin et al. | |
| 2011/0043472 A1 | 2/2011 | Hada | |
| 2011/0158476 A1* | 6/2011 | Fahn | B25J 13/08 382/103 |
| 2011/0172009 A1* | 7/2011 | Tan | A63F 13/10 463/31 |
| 2011/0179180 A1 | 7/2011 | Schleifer et al. | |
| 2011/0304541 A1 | 12/2011 | Dalal | |
| 2012/0019684 A1 | 1/2012 | Yang et al. | |
| 2015/0248167 A1* | 9/2015 | Turbell | G06F 3/017 715/754 |

OTHER PUBLICATIONS

European Search Report from EP Application No. 11181142.8, dated Apr. 29, 2014.

Chinese Office Action for CN Application No. 201110270376.0, dated Feb. 14, 2016.

* cited by examiner

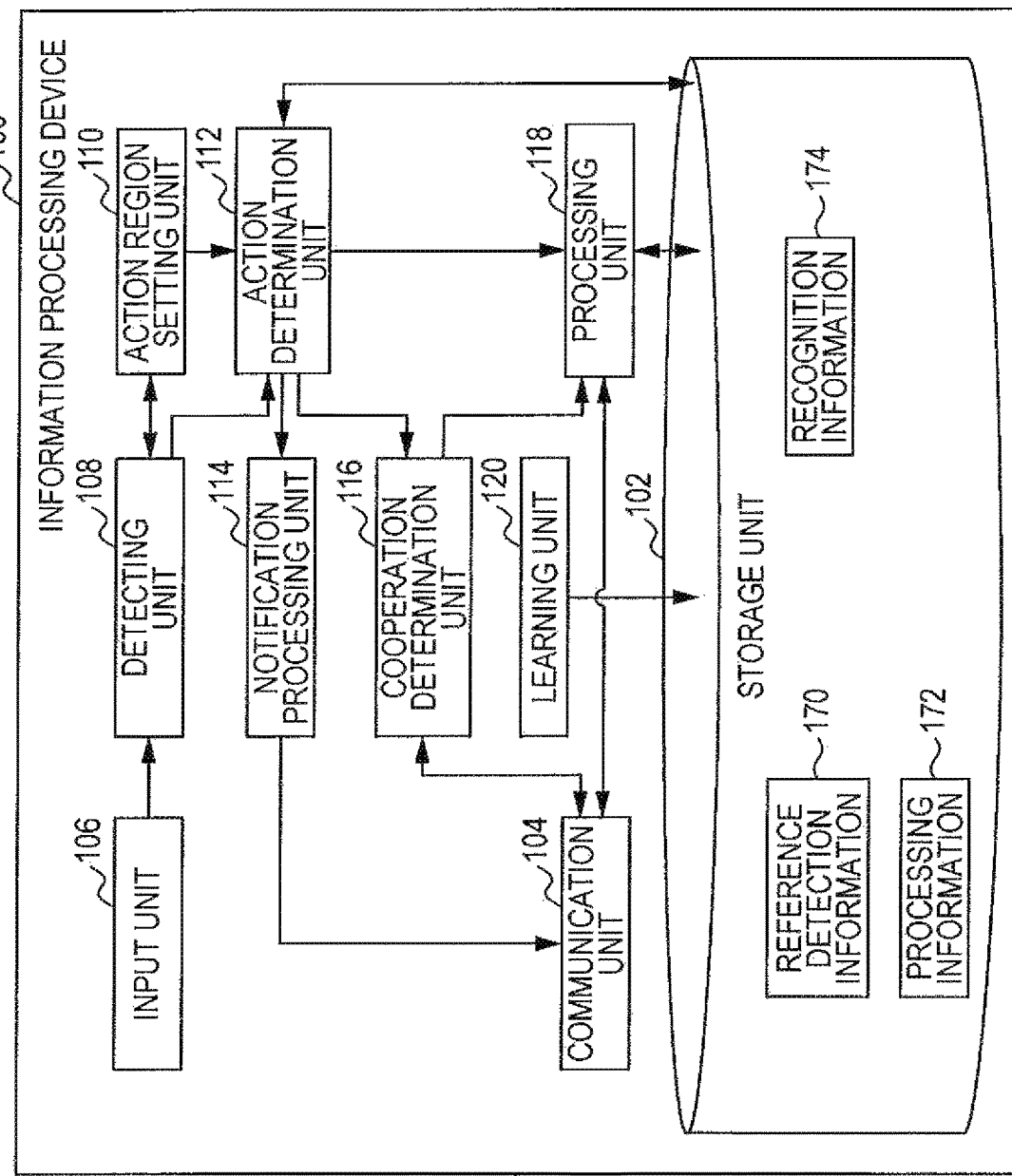
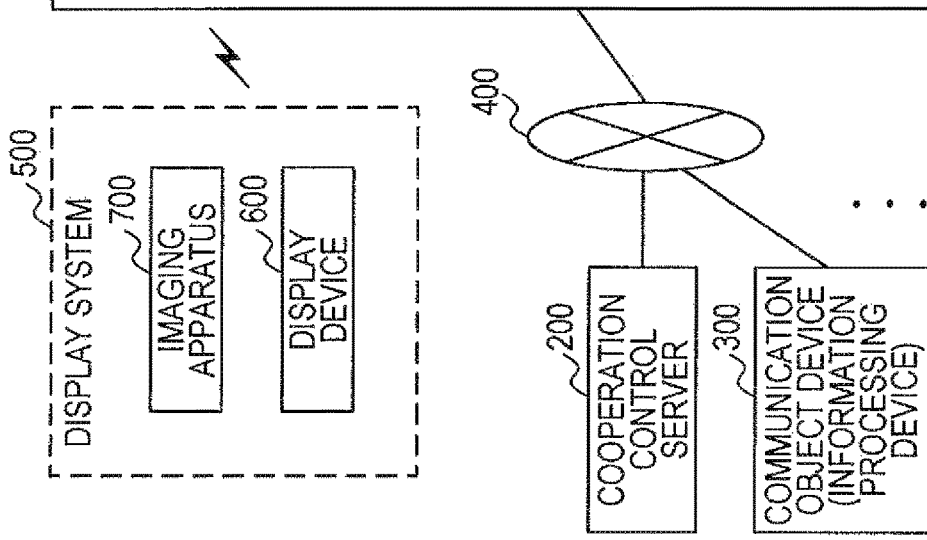

GESTURE CONTROLLED COMMUNICATION

CROSS-REFERENCE TO RELATED APPLICATION

The present application is a continuation of U.S. application Ser. No. 13/232,406, filed Sep. 14, 2011, which claims priority from Japanese Patent Application No. JP 2010-210778 filed in the Japanese Patent Office on Sep. 21, 2010, the entire content of which is incorporated herein by reference.

BACKGROUND

The present disclosure relates to an information processing device and an information processing method.

In recent years, functions of devices such as electronic devices and so forth have become more sophisticated as well as increasing in number, and the instructions which the user has to give to the device to user the device are becoming more varied and complex. As such, many devices employ GUI (Graphical User Interface) as the user interface, whereby instructions can be given to the device more easily than in a case of using a device employing CUI (Character User Interface).

However, for users who are not accustomed to using a pointing device such as a mouse for example, a GUI is not necessarily an interface with good operability. Accordingly, there is demand for a user interface by which users can give instructions to devices more intuitively. This has led to user interfaces being developed to improve user operability. Japanese Unexamined Patent Application Publication No. 2005-31799 is one example of a technique for detecting shapes and actions of part of the body of a user or objects operated by the user, and performing processing according to the detected results.

SUMMARY

In recent years, information processing devices which perform communication relating to calls (e.g., video calls) by, for example, images which have been imaged (Moving images, hereinafter referred to as "imaged images") and audio, and enable the calls among multiple users, are becoming commonplace. Now, in the event of a user who is performing communication by imaged images and audio for example, ending the call, the user operates the information processing device being used for the call or operates an external operation device such as a remote controller to cause the information processing device to end the communication relating to the call. However, in the above case for example, the user performs the operations relating to this operation before the call ends, so this is unnatural as compared to a case where multiple users, having a conversation and directly talking at the same place, state a parting phrase.

Now, an information processing device to which a technique according to the related art regarding a user interface for improving operability (hereinafter referred to simply as "related art") has been applied (hereinafter referred to as "information processing device according to the related art") detects gesture actions of the user using the arms, palms, fingers, and so forth (hereinafter referred to as "gestures" or simply as "actions"), in a space, by performing image processing of imaged images. In the event that user actions have been detected, the information processing device according to the related art performs processing corresponding to the detected actions. Accordingly, the user of a information processing device according to the related art can provide instructions to the information processing device according to the related art in a more intuitive manner than a case of using a GUI, and accordingly, that user operability might be improved using the related art. Also, by performing processing corresponding to user actions detected as with a information processing device according to the related art, in cases of ending a conversation by imaged images and audio as described above, the information processing device can end the communication in accordance with user actions by detecting user actions correlated with ending of communication, for example. Accordingly, unnaturalness owing to the user operating the information processing device or an external operating device such as described above for example, might be resolved by performing processing corresponding to user actions detected as with a information processing device according to the related art.

However, with the related art, shapes and actions of at least a part of the body of the user on the space, such as arms, palms, fingers or the like, or objects operated by the user, are detected to detect the user actions, so image processing has to be performed on the entire imaged image. Accordingly, the more type of actions there are to detect, and the more complex the actions are, the higher the processing capability demanded of the information processing device according to the related art performing image processing is. Now, even though the processing capabilities of information processing devices such as PCs (Personal Computer) and so forth have improved in recent years along with higher functionality, diverting a great amount of calculating resources to the user interface might result in insufficient calculating resources for realizing other functions such as functions for controlling communication, for example. Also, in the event of a case where calculating resources for realizing other functions has become insufficient, processing relating to this function is not performed until the insufficiency of calculating resources is resolved, so with information processing device according to the related arts, an undesirable situation can occur in which the user is made to wait for an unreasonable amount of time, or the function is not realized. Accordingly, with the case of using the related art, user operability is not improved without fail, since user convenience may be sacrificed in the process.

Also, in a case of multiple information processing devices performing communication having functions for performing processing corresponding to detected user actions as with the information processing device according to the related art, undesirable situations may occur due to processing corresponding to user actions being performed at one information processing device. An example of such an undesirable situation is communication being ended when one user of the multiple information processing devices performing communication performs a predetermined action to end communication and communication ends, even though another user does not desire ending of the communication. In the event that an undesirable situation occurs due to processing being performed corresponding to user operations at one information processing device of information processing devices performing communication, deterioration in user convenience can occur, so improvement in user operability can hardly be hoped for.

Now, with the related art, no consideration whatsoever has been made regarding cases of multiple information processing devices performing communication. Accordingly, the above-described deterioration in user convenience can occur even if the related art is used.

It has been found desirable to provide a new and improved information processing device and information processing method whereby user operability can be improved in a communication system in which multiple information processing device can communicate.

In view of the above, the present embodiments are provided. According to some illustrative embodiments, a device and method are implemented by detecting a face region of an image, setting at least one action region according to the position of the face region, comparing image data corresponding to the at least one action region to detection information for purposes of determining whether or not a predetermined action has been performed, and executing predetermined processing based on cooperation control information when it is determined that the predetermined action has been performed and the cooperation control information is received.

According to some other illustrative embodiments, a server and method are implemented by receiving determination notification information from a processing device that detects a face region of an image, sets at least one action region according to the position of the face region, compares image data corresponding to the at least one action region to detection information for purposes of determining whether or not a predetermined action has been performed, and transmits the determination notification information when it is determined that the predetermined action has been performed, and performing cooperation determination processing in response to receiving the determination notification information.

BRIEF DESCRIPTION OF THE DRAWINGS

FIG. 20 is a block diagram illustrating an example of the configuration of an information processing device according to a second embodiment of the present disclosure.

DETAILED DESCRIPTION OF EMBODIMENTS

Figure 1:
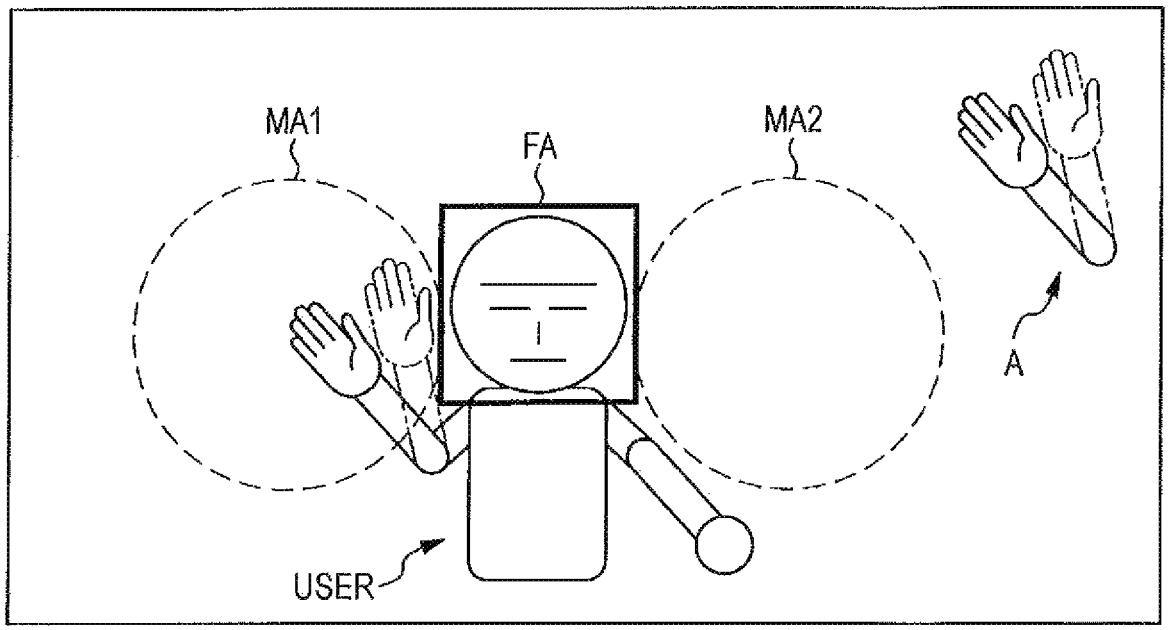
FIG. 1 is an explanatory diagram illustrating an example of action regions which an information processing device according to an embodiment of the present disclosure sets.

Preferred embodiments of the present disclosure will be described with reference to the appended drawings. Note that in the present Specification and drawings, components having substantially same functional configurations will be denoted with the same reference numeral, and redundant description will be omitted. Also, description will be made below according to the following order.

1. Approaches According to Embodiment of Present Disclosure 1-1. First Operability Improvement Approach: Approach Relating to User Interface 1-1-1. First Processing for First Operability Improvement Approach 1-1-2. Second Processing for First Operability Improvement Approach 1-2. Second Operability Improvement Approach: Approach Relating to Cooperative Processing 2. Information Processing Device According to Embodiments of Present Disclosure 3. Program According to Embodiment of Present Disclosure

1. Approaches According to Embodiment of Present Disclosure

Before describing the configuration of an information processing device according to an embodiment of the present disclosure (hereinafter, may be referred to as "information processing device 100"), operability improvement approaches according to an embodiment of the present disclosure will be described. In the following, description will be made by way of a primary example of a configuration wherein an imaged image that has been imaged at an external device of the information processing device 100 is input to the information processing device 100, and the information processing device 100 processes the imaged image. Note that the configuration of the information processing device 100 according to an embodiment of the present disclosure is not restricted to the above, and an arrangement may be made wherein, for example, the information processing device 100 has imaging functions, and the imaged image that has been imaged using the imaging functions is processed. Also, an imaged image according to an embodiment of the present disclosure is a moving image obtained by imaging (group of still images imaged consecutively on a time axis). Also, processing relating to operability improvement approaches according to an embodiment of the present disclosure described below can be understood to be processing relating to an information processing method according to an embodiment of the present disclosure.

Overview of Operability Improvement Approaches 1-1. First Operability Improvement Approach: Approach Relating to User Interface As described above, in a case of detecting user actions and performing processing corresponding to the detected actions, the user can give instructions to the information processing device more intuitively than with a case of using a GUI. Also, in a case of detecting user actions and performing processing corresponding to the detected actions, unnaturalness owing to the user operating an information processing device or external operating device as described above for example, can be resolved. Accordingly, the information processing device 100 detects user actions by performing image processing of imaged images, and performing processing corresponding to the detected actions, thereby improving user operations.

Now, in the case of performing image processing as to an entire imaged image as with a information processing device according to the related art, high processing capabilities are a prerequisite to perform image processing. Thus, diverting a great amount of calculating resources to the user interface might as with information processing device according to the related arts may result in insufficient calculating resources for realizing other functions. Also, in the event of a case where calculating resources for realizing other functions has become insufficient, an undesirable situation can occur in which the user is made to wait for an unreasonable amount of time, or the function is not realized.

Accordingly, with the information processing device 100 a region including the face of the user (hereinafter referred to as "face region") is detected from the imaged image, and action region in the imaged image for detecting user actions are set nearby the face region identified by detection (hereinafter may be referred to as "identified face region"). The information processing device 100 detects predetermined actions of the user in the set action regions, and performs processing as to predetermined actions that have been detected. Now, predetermined user actions according to an embodiment of the present disclosure are user actions which are the object of determination, in which determination is made at the information processing device 100 regarding whether or not an action has been performed. Also, examples of a predetermined user action according to an embodiment of the present disclosure are an action causing an individual information processing device 100 to perform processing corresponding to an operation, and an action causing processing to be performed cooperatively between the information processing device 100 and one or multiple other information processing devices which are the object of performing communication (hereinafter may be referred to as "communication object device"). The information processing device 100 performs the above determination based on, for example, an imaged image, and later-described reference detection information or individual determination information. Note that the information processing device 100 and a communication object device performing processing cooperatively will be described in the later-described second operability improvement approach.

By setting action regions as described above, the information processing device 100 can detect user actions by performing image processing on a region which is a part of the imaged image, rather than performing image processing on the entire imaged image as with information processing device according to the related arts. Now, with the information processing device 100, the calculation load relating to the user interface can be markedly reduced as compared to information processing device according to the related arts, so there is no concern of insufficient calculation resources for realizing other functions as with information processing device according to the related arts. Also, the information processing device 100 identifies the face region from imaged images by performing face recognition processing, which is relatively light processing implemented in devices which do not have processing capabilities very high, such as digital cameras of cellular phones for example, and sets action regions nearby the face region, so the calculation load at the time of setting action regions is not great, either. Accordingly, the information processing device 100 can prevent occurrence of undesirable situations which can happen with information processing device according to the related arts, such as the user being made to wait for an unreasonable amount of time, or functions other than the user interface not being realized, for example, so user convenience is not deteriorated as with information processing device according to the related arts. Accordingly, the information processing device 100 can improve user operability.

Also, the information processing device 100 performs processing corresponding to predetermined actions detected in the action regions sent nearby the face region, so erroneous detection of predetermined actions due to actions performed by people or objects other than the user corresponding to the face region for example, can be reduced as compared to information processing device according to the related arts which take the entire imaged image and the object of processing. Accordingly, the information processing device 100 can further improve user operability as compared to information processing device according to the related arts.

Also, the information processing device 100 performs processing correlated to the meaning of the predetermined action, as processing corresponding to the predetermined action detected in the action regions set nearby the face region. For example, in the event of having detected an action where the user reciprocally moves a hand sideways nearby the face (Generally, an action meaning "good-bye" or "bye-bye", hereinafter may be referred to as "bye-bye action") as the predetermined action, the information processing device 100 performs processing correlated to the meaning of the detected action, such as processing of turning off electric power to a device to be controlled (information processing device or external device), ending communication with a communication object device (e.g., terminate a session), muting audio (including music) output from the device, terminating communication at the device, or the like, for example. Also, in the event of having detected an action where the user reciprocally moves a hand vertically in the action region as the predetermined action, the information processing device 100 performs processing correlated to the meaning of the detected action, such as raising the volume of the audio output from a device to be controlled, or the like, for example.

As described above, by the information processing device 100 performing processing correlated to the meaning of detected action (processing taking affordance into consideration), the chance that the user will sense inconsistency between the user's own actions and the processing which the information processing device 100 performs (or processing which the information processing device 100 causes an external device to perform) can be further reduced. Accordingly, the information processing device 100 can further improve user operability.

Further, in the event of determining that a predetermined action has been performed (in the event that a predetermined action has been detected), the information processing device 100 can further perform notification processing in which the user is notified that determination has been made at the information processing device 100 that a predetermined action has been performed. Also, in the event of performing notification processing, in a case of determination having been made that a predetermined action has been continuously performed for a predetermined period from determination having been made that the predetermined action has been performed, the information processing device 100 performs processing corresponding to the predetermined action that has been determined.

Now, examples of notification processing according to an embodiment of the present disclosure include changing an image displayed on a display screen of a display unit (described later) which the device itself has, or changing the lit state of a lighting device provided to the display unit, thereby visually performing notification to the user. That is to say, notification processing according to an embodiment of the present disclosure can be understood as feedback processing to the user. Note that the notification processing according to an embodiment of the present disclosure is not restricted to the above. For example, the information processing device 100 can perform processing for audibly performing notification to the user, such as outputting audio indicating that determination has been made that a predetermined action has been performed, from an audio output device which the device itself has (e.g., a later-described audio output unit) or an external audio output device or the like, as notification processing. Also, The information processing device 100 may transmit a processing execution command to notify an external device that determination has been made at the information processing device 100 that a predetermined action has been performed, to an external device via a network (or directly), as notification processing. By the above, the information processing device 100 can cause an external device to perform notification to the user.

By the information processing device 100 performing notification processing, the user can be made to comprehend that the action which the user has performed has been recognized by the information processing device 100. Also, in the event that determination has been made that the predetermined action has been performed continuously for a predetermined period, the information processing device 100 performs processing corresponding to the determined predetermined action, so the user can cancel execution of the processing corresponding to this action at the information processing device 100 by quitting his/her own action. Accordingly, in the event the user desires to cancel execution of processing corresponding to the action at the information processing device 100 after the user has performed the predetermined action and the information processing device 100 has recognized this, or even in the event that the information processing device 100 has happened to erroneously detect an action which the user has performed, for example, the user can control executing of processing at the information processing device 100 corresponding to this action, by his/her own action.

Accordingly, by performing notification processing and further selectively performing processing corresponding to a predetermined action determined in the event that determination has been made that the predetermined action has bee continuously performed for a predetermined period, the information processing device 100 can prevent processing unintended by the user from being executed due to erroneous detection, and accordingly can further improve user convenience and operability.

The information processing device 100 improves user operability by performing processing such as described above for example, as processing relating to the first operability improvement approach. More specifically, the information processing device 100 performs 1-1-1. first processing for first operability improvement approach and 1-1-2. second processing for first operability improvement approach for example, thereby improving user operability.

1-1-1. First Processing for First Operability Improvement Approach

First, the first processing for the first operability improvement approach according to an embodiment of the present disclosure will be described. The information processing device 100 performs the following processing of (1) through processing of (4), thereby improving user operability.

(1) Face Region Detection Processing

The information processing device 100 detects the face of the user (subject) from the imaged image, and identifies a face region. Now, identifying the face region can be performed by detecting feature points of, for example, the user's eyes, nose, mouth, structure, and so forth, and detecting facial brightness distribution and regions similar to a structural pattern. Note that the face region detection processing at the information processing device 100 according to an embodiment of the present disclosure is not restricted to the above. For example, the information processing device 100 can detect the difference between a current frame to be processed and one frame back to detect a moving body, and detect the face region by identifying the head from the moving body.

Also, data relating to identification of the face region at the information processing device 100, such as data of face brightness distribution and structure pattern and so forth, is stored in a storage unit (later described) which the information processing device 100 has. Note that the information processing device 100 can perform communication with an external device such as a server via a communication unit (later described) which the information processing device 100 has for example, and obtain data relating to identification of a face region from the external device.

Figure 3:
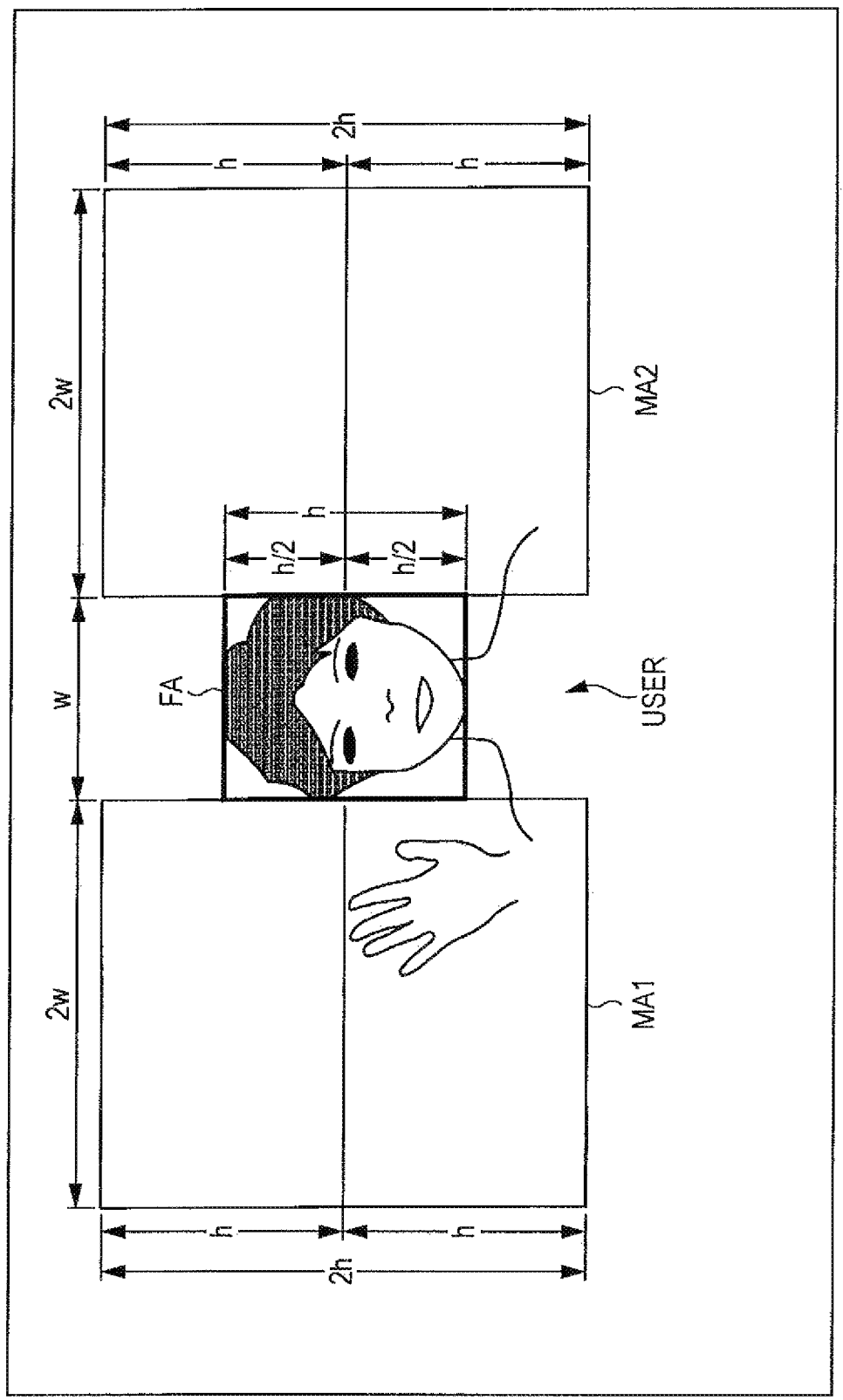
FIG. 3 is an explanatory diagram illustrating an example of action region setting processing with the information processing device according to an embodiment of the present disclosure.

Also, as shown in FIG. 1 for example, the information processing device 100 identifies a region greater than the face and including the detected face, but the face region identifying method at the information processing device 100 is not restricted to the above. For example, the information processing device 100 may identify the smallest region of the region including the detected face (e.g., a region closely containing the detected face such as shown in FIG. 3), as the face region.

The information processing device 100 identifies the face region as described above, for example. Now, the imaged image which the information processing device 100 processes is a moving image, there can be cases where the position in the imaged image of the face region identified in a certain frame changes in the next frame. Accordingly, the information processing device 100 performs face region detection processing for each frame, for example. Note that the frequency of performing face region detection processing according to an embodiment of the present disclosure is not restricted to the above, and the information processing device 100 may perform face region detection processing every predetermined frame, or every predetermined time, for example.

(2) Action Region Setting Processing

Upon the face region being detected in the above processing of (1) (face region detection processing), the information processing device 100 sets action regions nearby the face region, based on the face region.

Figure 2:
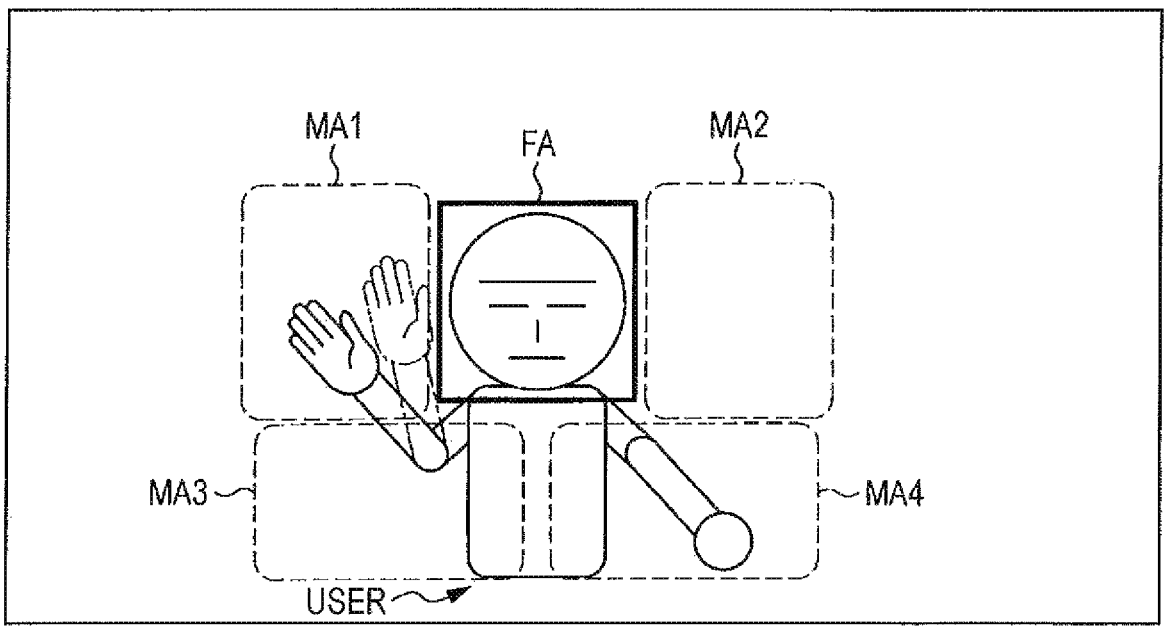
FIG. 2 is an explanatory diagram illustrating an example of action regions which the information processing device according to an embodiment of the present disclosure sets.

FIGS. 1 and 2 are explanatory diagrams illustrating an example of the action regions which the information processing device 100 according to an embodiment of the present disclosure sets. FA in FIGS. 1 and 2 denotes the face region of the user which the information processing device 100 has detected, and MA1 and MA2 in FIG. 1, and MA1 through MA4 in FIG. 2, illustrate an example of the action region which the information processing device 100 has set. Hereinafter, the face region may be referred to as "face region FA", and the action regions may be collectively referred to as "action region MA". Now, the face region FA and action region MA shown in FIGS. 1 and 2 have been illustrated for sake of convenience of description, and in the event the imaged image is to be displayed on a display screen of an external device such as a display device for example, or on a display screen of a display unit (later described) which the information processing device 100 has, the face region FA and action region MA do not have to be explicitly shown (this holds true throughout the following description). It goes without saying that the information processing device 100 according to an embodiment of the present disclosure may display an imaged image in which the face region FA and action region MA are explicitly shown on the display screen.

Now, while FIG. 1 illustrates an example where the information processing device 100 has set circular action regions, the action regions MA set by the information processing device 100 according to an embodiment of the present disclosure are not restricted to the example shown in FIG. 1. For example, the information processing device 100 may set action regions of various shapes, such as rectangular action regions as those shown in FIG. 2, elliptical action regions, and so forth. Also, while FIG. 1 shows a case where the information processing device 100 has set action regions MA nearby the left side of the face region FA and nearby the right side of the face region FA, the action regions MA which the information processing device 100 according to an embodiment of the present disclosure sets are not restricted to the above-described. For example, the information processing device 100 may set an action region MA to one of nearby the left side of the face region FA or the nearby the right side of the face region FA. Also, as shown in FIG. 2 for example, the information processing device 100 may further set one or multiple action regions MA to nearby below the face region FA. Also, the information processing device 100 may set one or multiple action regions MA to one of nearby below the face region FA or nearby above the face region FA, or to both nearby below the face region FA and nearby above the face region FA. It goes without saying that the action regions MA which the information processing device 100 sets near the face region are not restricted to the above-described.

By setting action regions MA such as shown in FIGS. 1 and 2, the information processing device 100 does not detect an action performed outside of an action region MA, such as indicated by A in FIG. 1 for example, as a predetermined action. Accordingly, the information processing device 100 can reduce the probability of erroneously detecting a predetermined action more than with a information processing device according to the related art which takes the entire imaged image as the object of processing.

Also, by setting multiple action regions MA nearby the face region FA as shown in FIG. 2 for example, the information processing device 100 can detect predetermined actions in each of the multiple action regions MA, and perform processing for each action region MA corresponding to the detected predetermined actions, for example.

Now, in the event of increasing the number of action regions MA to be set as shown in FIG. 2, for example, the calculation load is greater than the case shown in FIG. 1, but in comparison with a information processing device according to the related art which performs image processing on the entire imaged image, the calculation load is markedly reduced. Accordingly, event in the event of increasing the number of action regions MA to be set as shown in FIG. 2 for example, there is no concern of insufficient calculation resources as with information processing device according to the related arts, so there is no deterioration in user convenience.

Also, by performing processing corresponding to a predetermined action for each action region MA as described above, the information processing device 100 can perform processing different for each detected action region MA even in the event that the user has performed the same predetermined action, for example. That is to say, the information processing device 100 can appropriate multiple processing for one predetermined action. It goes without saying that the processing which the information processing device 100 performs in the event that one predetermined action is detected at each of the multiple action regions MA may be the same.

Further, by performing processing corresponding to predetermined operations for each action region MA as described above, the information processing device 100 can perform processing correlated with the meaning of the detected action (processing taking affordance into consideration), coupled with the position where the predetermined action was detected (more specifically, in which region it was detected). Accordingly, the information processing device 100 can further improve user operability.

Specific Example of Action Region Setting Processing

Now, an example of action region setting processing with the information processing device 100 will be described in further detail. FIG. 3 is an explanatory diagram for describing an example of action region setting processing at the information processing device 100 according to an embodiment of the present disclosure. Now, FIG. 3 illustrates an example of processing in a case of setting action regions MA to nearby the left side and nearby the right side of the face region FA, as shown in FIG. 1.

The information processing device 100 sets action regions MA based on the width (length in horizontal direction) w and height (length in vertical direction) h of the identified face region FA. Now, FIG. 3 illustrates an example where the information processing device 100 has set rectangular action regions MA1 and MA2 with a width of 2w and a height of 2h. Note that the information processing device 100 can also set the action regions MA so as to be ellipses where 2w and 2h are the minor axis and major axis, for example (a circle when w=h).

Also, the information processing device 100 sets the action regions MA so as to come into contact with the identified face region FA as shown in FIG. 3 for example, but the setting method of the action regions MA by the information processing device 100 is not restricted to the above-described. For example, the information processing device 100 may set the action regions MA at positions distanced from the identified face region FA by a predetermined number of pixels. That is to say, to "set an action region nearby a face region" according to an embodiment of the present disclosure includes setting an action region MA in contact with a face region FA and setting an action region MA at a position in close proximity to a face region FA.

As described above, for example, the information processing device 100 sets the action regions MA based on the width w and height h of the identified face region FA.

Note that the setting processing of action regions MA with the information processing device 100 according to an embodiment of the present disclosure is not restricted to the above-described. For example, the information processing device 100 may perform face recognition processing on the image within the face region FA in the imaged image to estimate user attributes such as age and gender and the like of the user with regard to this face region FA, and adjust the region size and position of the action regions MA, based on the estimation results. By adjusting the region size and position of the action regions MA based on the estimation results as described above, action regions MA can be set corresponding to the age and gender of the user, such as setting the position of the action regions MA shown in FIG. 2 so as to be lower for aged users, for example. Note that while the information processing device 100 estimates user attributes by extracting attribute information such as structure, wrinkles, sagging skin, and so forth for example, from the face region FA and analyzing this, the method for estimating user attributes according to an embodiment of the present disclosure is not restricted to the above-described. For example, the information processing device 100 may estimate user attributes using optional techniques capable of estimating user attributes such as age and gender and the like of the user corresponding to the face region FA.

Also, the information processing device 100 can extract face information indicating features of the face of the user by performing face recognition processing to the image in the face region FA, and adjust the action regions MA by identifying the user corresponding to the face region FA based on the extracted face information. More specifically, in the event that the user has been identified based on the face information, the information processing device 100 sets action regions MA for the identified user. An example of information relating to setting of action regions MA for the user include a database where face information and information relating to adjustment of the action regions MA is recorded. Also, information relating to setting of the action regions MA of the user may be included in later-described individual detection information. The information processing device 100 can obtain face information indicating the features of the face of the user that has been extracted, but extracting facial features of the user (e.g., structure information, information indicating the positional relation of eyes, nose, and mouth, and so forth) by performing image processing of the face region FA, for example. Also, the information processing device 100 obtains information relating to adjustment of the action regions MA, such as adjustment amount of region size of the action regions MA, position adjustment amount of action regions MA, and so forth, based on user operations, for example. Note that the information relating to adjustment of action regions MA may include information indicating the number of action regions MA set. By setting action regions MA for users as described above, the action regions MA which the users themselves can adjust can be set, so the information processing device 100 can further increase the freedom of the user, and improve convenience.

By performing processing such as described above for example, the information processing device 100 sets action regions MA nearby the face region FA based on the face region FA. Now, as described above, the imaged image which the information processing device 100 processes is a moving image, so the position of the face region in the imaged image identified in a certain frame may change in the next frame. The information processing device 100 performs setting of the action regions MA based on the face region FA each time a face region FA is identified by the processing of (1) above, but the action region setting processing by the information processing device 100 according to an embodiment of the present disclosure is not restricted to the above-described. For example, the information processing device 100 may detect the amount of movement of the face region FA in the current frame as to the face region FA in the previous frame, and in the event that the amount of movement is equal to or smaller than a predetermined threshold (or smaller than the threshold), sets the action region MA set in the previous frame so as to be moved to corresponding to the amount of movement. It goes without saying that the face region FA in the previous frame is not restricted to one frame back from the current frame (for example, in the event that the processing of (1) is to be performed every predetermined frame, the frame before the predetermined frame is the previous frame).

(3) Action Determination Processing

Upon action regions MA being set in the processing of (2) above (action region setting processing), the information processing device 100 determines that a predetermined action has been performed by the user in an action region MA, based on the imaged image, and the reference detection information or individual detection information.

Now, reference detection information according to an embodiment of the present disclosure is data serving as a reference of detection of predetermined actions of the user (object of detection). Here, the information processing device 100 stores the reference detection information beforehand by this being recorded in the information processing device 100 at the time of manufacturing by the manufacturer of the information processing device 100, but the information processing device 100 is not restricted to a configuration of storing reference detection information beforehand. For example, the information processing device 100 may obtain reference detection information generated by an external device such as a server or the like, from the external device. Examples of reference detection information include data and databases where predetermined actions and periodic component information for detecting periodic actions are correlated. Also, examples of periodic component information according to an embodiment of the present disclosure include information of frequency of change in brightness in the imaged image, but periodic component information according to an embodiment of the present disclosure is not restricted to the above. Note that reference detection information according to an embodiment of the present disclosure is not restricted to the above, and may be data and databases where predetermined actions, and information for distinguishing gestures of the user which are not periodic actions (e.g., data for determining that the shape of the hand of the user is a predetermined shape), are correlated. Hereinafter, description will be made with reference to an example where reference detection information is a data base in which predetermined actions and periodic component information are correlated for each predetermined action and recorded. Note that while examples of the database according to an embodiment of the present disclosure include relational databases, the database according to an embodiment of the present disclosure is not restricted to the above.

Also, individual detection information according to an embodiment of the present disclosure is data to serve as a reference for detection of predetermined actions which a particular user performs. The individual detection information is generated and updated by a learning unit (later described), for example. Note that the individual detection information according to an embodiment of the present disclosure may be generated by an external device such as a server, with the information processing device 100 obtaining the individual detection information from the external device. Now, examples of individual detection information include predetermined actions, data and databases where periodic component information for detecting periodic actions of the user, and face information indicating facial features of the user (information for identifying the user), are correlated. Note that the individual detection information according to an embodiment of the present disclosure is not restricted to the above-described, and may be data and databases where predetermined actions, information for distinguishing gestures of the user which are not periodic actions, and facial information, are correlated. Hereinafter, description will be made with reference to an example where the individual detection information is a database where predetermined actions, periodic component information, and facial information, are correlated for each predetermined action, and recorded.

(3-1) First Example of Action Determination Processing

Processing based on reference detection information will be described as a first example of action determination processing according to an embodiment of the present disclosure. The information processing device 100 detects a periodic component in an action region MA set based on the imaged image. The information processing device 100 then determines whether or not a predetermined action has been performed, based on the detection results at the action region MA and periodic component information of the reference detection information. Now, the information processing device 100 determines whether or not a predetermined action has been performed by analyzing properties of a specific point (specific pixel) within the action region MA, using the Fischer's method or the like for example, but the determination method according to an embodiment of the present disclosure is not restricted to the above. Also, while the information processing device 100 detects the periodic components in the action region MA using imaged images every predetermined time or imaged images in increments of a predetermined number of frames, for example, the detection method for periodic components in the action region MA according to an embodiment of the present disclosure is not restricted to the above-described.

(3-2) Second Example of Action Determination Processing

Next, processing selectively using reference detection information or individual detection information will be described as a second example of action determination processing according to an embodiment of the present disclosure. The information processing device 100 extracts face information from the face region FA identified by the processing of (1) above. Also, the information processing device 100 determines whether or not there is face information corresponding to the face information extracted from the individual detection information, based on the extracted face information and individual detection information. Now, in the event that the face information according to an embodiment of the present disclosure is a group of multiple information, such as information of the structure and information indicating the positional relation of the eyes, nose, and mouth, for example, the information processing device 100 determines that there is face information corresponding to the extracted face information in the event that there is face information matching the extracted face information in the individual detection information. Note that the determination method regarding whether or not there is face information corresponding to the extracted face information in the individual detection information performed at the information processing device 100 according to an embodiment of the present disclosure, is not restricted to the above-described. For example, the information processing device 100 may determine that there is face information corresponding to the extracted face information in the event that there is face information matching face information regarding which a predetermined number or greater of the group of multiple information has been extracted.

In the event of having determined that there is individual detection information corresponding to the extracted face information, the information processing device 100 determines whether or not a predetermined action correlated with the periodic component information has been made, based on the detection results of the periodic component in the action region MA, and the periodic component information included in the individual detection information.

Also, in the event that determination is not made that there is individual detection information corresponding to the extracted face information, the information processing device 100 determines whether or not a predetermined action has been performed, based on the detection results and periodic component information of the reference detection information, in the same way as with the first example of action determination processing described above.

As described above for example, the information processing device 100 determines that a predetermined action has been performed by the user in an action region MA, based on the imaged image and reference detection information or individual detection information, as described above for example. Note that the action determination processing at the information processing device 100 according to an embodiment of the present disclosure is not restricted to the above. For example, in the event of performing determination using information for distinguishing gestures of the user which are not periodic components, for example, the information processing device 100 can determine that a predetermined action has been performed by the user in an action region MA, based on whether or not the shape of the hand of the user in the action region MA is a predetermined shape stipulated in information for distinguishing the gestures in the reference detection information or individual detection information.

Also, in the event that determination is made that a predetermined action has been performed, the information processing device 100 can also update the individual detection information (so-called learning). More specifically, in the event that determination is made that a predetermined action has been performed, the information processing device 100 takes periodic component information detected based on the imaged image, for example, as periodic component information in the individual detection information corresponding to the determined predetermined action and the face information extracted from the imaged image. Also, in the event that determination is made that a predetermined action has been performed, the information processing device 100 may take information representing the shape of the hand of the user that has been detected (i.e., information of the position of joints, etc.), for example, as information for distinguishing the gestures in the individual detection information. By updating the individual detection information as described above, the information processing device 100 can further improve the determination precision of predetermined actions of a particular user of which predetermined actions are determined from individual detection information, and thus further reduce the possibility or erroneous determination.

Now, the information processing device 100 performs the above-described processing relating to updating of individual detection information each time determination is made that a predetermined action has been performed (processing relating to learning), for example, but processing at the information processing device 100 is not restricted to the above. For example, the information processing device 100 can selectively perform processing relating to updating of the individual detection information (processing relating to learning), based on user operations.

Also, in the event of determining whether or not a predetermined action has been performed using periodic component information, the information processing device 100 determines whether or not a predetermined action has been performed each time a periodic component is detected in an action region MA for example, but the action determination processing according to an embodiment of the present disclosure is not restricted to the above. For example, the information processing device 100 may detect whether or not there is a moving body in an action region MA set based on the imaged image every predetermined time or imaged images in increments of a predetermined number of frames, and selectively determine that a predetermined action has been performed in the event that a moving body is detected. Now, in the event that no moving body is detected in an action region MA when determining whether or not a predetermined action has been performed using periodic component information, the probability that the user has not performed an action in action region MA is high. Accordingly, by selectively detecting whether or not a predetermined action has been performed in the event that a moving body is detected as described above, the information processing device 100 can reduce calculation load on the information processing device 100 while preventing missed detection of predetermined actions of the user and erroneous detection.

(4) Execution Processing

Upon determination being made that a predetermined action has been performed in the processing of (3) above (action determination processing), the information processing device 100 performs processing corresponding to the determined predetermined action.

More specifically, the information processing device 100 stores processing information in which the predetermined action and processing to be executed have been recorded in a correlated manner for example, and performs processing correlated with the determined predetermined action in the processing of (3) above, based on the processing results of (3) above and the processing information. Note that the processing information according to an embodiment of the present disclosure is not restricted to the above-described. For example, the information processing device 100 may store processing information in which information indicating an action region MA (e.g., region No. or the like), predetermined action, and processing to be executed, recorded in a correlated manner. In the case described above, the information processing device 100 can perform processing corresponding to a predetermined action for each action region MA regarding which determination has been made that a predetermined action has been performed. Also, the processing information according to an embodiment of the present disclosure may be, for example, data for each predetermined action, or may be a database in which is recorded information relating to multiple predetermined actions.

Also, while an example of processing corresponding to a predetermined action which the information processing device 100 performs includes processing relating to functions which the device itself has, the processing corresponding to the predetermined actions which the information processing device 100 according to an embodiment of the present disclosure performs is not restricted to the above. For example, as processing corresponding to a predetermined action, the information processing device 100 may transmit a processing execution command for causing an external device to perform processing corresponding to a predetermined action, via a network (or directly) to the external device. Thus, the information processing device 100 can cause the external device to perform processing corresponding to predetermined actions of the user.

The information processing device 100 performs processing of (1) (face region detection processing) through processing of (4) (execution processing) described above for example, as first processing relating to first operability improvement approach, thereby determining that the user has performed a predetermined action, and perform processing corresponding to the determined predetermined action.

Now, the information processing device 100 sets action regions MA nearby the face region FA identified based on the imaged image, detects (determines) predetermined actions of the user in the set action regions MA, and performs processing corresponding to the detected predetermined actions. By setting the action regions MA as described above, the information processing device 100 can detect predetermined actions of the user by performing image processing as to a partial region of the imaged image, rather than performing image processing on the entire imaged image as with information processing device according to the related arts. Accordingly, the information processing device 100 can reduce the calculation load relating to detection of predetermined actions by the user as compared to information processing device according to the related arts, so with the information processing device 100, occurrence of undesirable situations which can happen with information processing device according to the related arts, such as the user being made to wait for an unreasonable amount of time, or functions other than user interface not being realized, for example, can be prevented. Accordingly, the information processing device 100 can prevent deterioration in user convenience which can occur in a case of using the related art, and also, user operability can be improved.

1-1-2. Second Processing for First Operability Improvement Approach

The information processing device 100 can improve user operability by performing the first processing for the first operability improvement approach described above. However, the processing for the first operability improvement approach is not restricted to the above-described. For example, as described above, the information processing device 100 can perform processing corresponding to a predetermined action determined in the case of having performed notification processing whereupon determination is made that the predetermined action has been performed continuously for a predetermined period. Accordingly, next, processing in a case of performing notification processing will be described as the second processing for the first operability improvement approach according to an embodiment of the present disclosure. The information processing device 100 performs the following processing of (I) through processing of (V) for example, thereby preventing processing unintended by the user due to erroneous detection from being performed, and further improving user convenience and operability.

(I) Face Region Detection Processing

In the same way as with the processing of (1) above (face region detection processing), the information processing device 100 detects the face of the user from in the imaged image, and determines the face region FA.

(II) Action Region Setting Processing

Upon the face region being detected in the processing of (1) above (face region detection processing), the information processing device 100 sets action regions MA nearby the face region FA, based on the face region FA, in the same way as with the processing of (2) above (action region setting processing).

(III) Action Determination Processing

Upon setting of the action regions MA in the processing of (II) above (face region detection processing), the information processing device 100 determines that a predetermined action by the user has been performed in an action region MA, based on the imaged image and reference detection information or individual detection information, in the same way as with the processing of (3) above (action determination processing).

Also, the information processing device 100 determines whether or not a predetermined action has been continuously performed for a predetermined period from determination having been made that the predetermined action has been performed. Now, an example of the predetermined period from the determination having been made includes the time for performing the processing of (IV) described later, but the predetermined period from the determination having been made according to an embodiment of the present disclosure is not restricted to be above-described. For example, the predetermined period from determination having been made according to an embodiment of the present disclosure can be arbitrarily set by the manufacturer of the information processing device 100 or the like, such as for example, time of the time for performing the processing of (IV) described later plus leeway time.

(IV) Notification Processing

Upon determination being made that a predetermined action has been performed in an action region MA in the processing of (III) above (action determination processing), the information processing device 100 performs notification processing.

Specific Example of Notification to User

Now, a specific example of notification to the user by notification processing according to an embodiment of the present disclosure having been performed will be described. In the following, description will be made with reference to an example of a case of performing notification processing for visually notifying the user.

Figure 4:
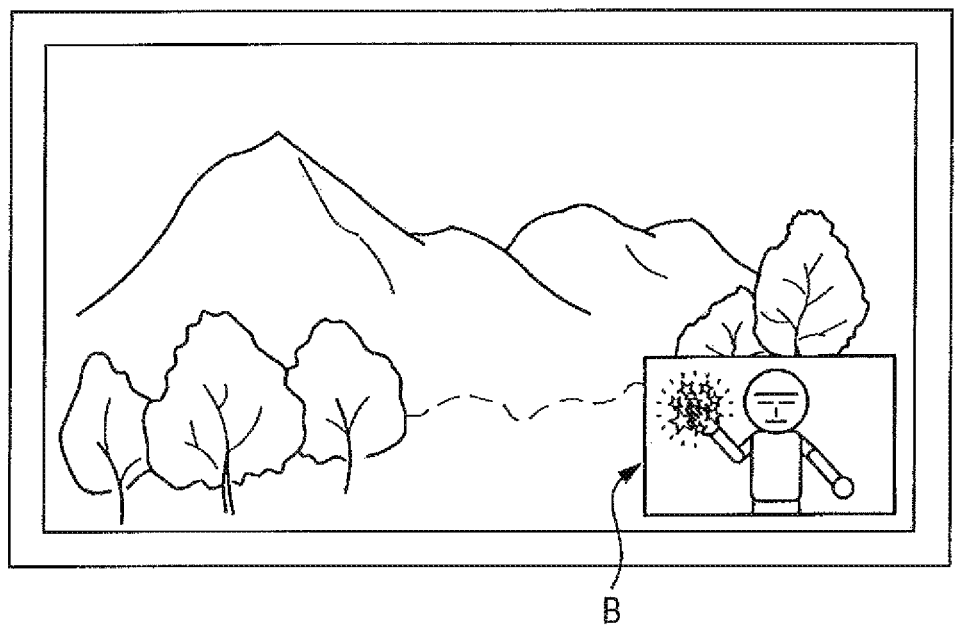
FIG. 4 is an explanatory diagram illustrating an example of notification to a user due to notification processing according to an embodiment of the present disclosure being performed.

FIG. 4 is an explanatory diagram illustrating an example of notification to the user by notification processing according to an embodiment of the present disclosure being performed. Here, FIG. 4 illustrates an example where the imaged image is displayed on a display screen (for example, a display screen of an external device such as a display device or a display unit (later described) which the information processing device 100 has, hereinafter the same), and visual notification is made that determination has been made that a predetermined action has been performed, by changing the displayed imaged image, as shown in B in FIG. 4. That is to say, FIG. 4 illustrates an example of a case of visually making notification that the information processing device 100 has determined that the predetermined action has been performed, by changing the image displayed on the display screen.

Figure 5:
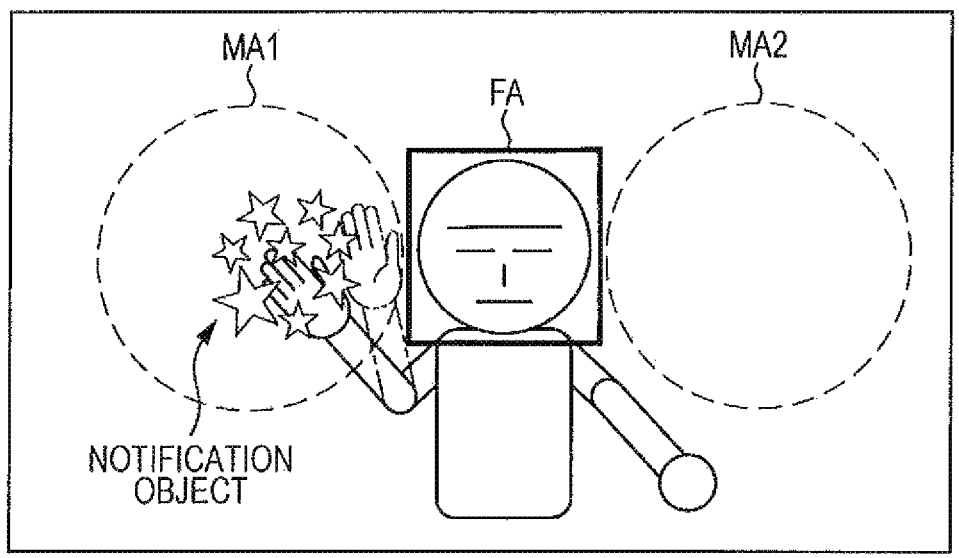
FIG. 5 is an explanatory diagram illustrating an example of change of an imaged image due to notification processing according to an embodiment of the present disclosure being performed.

FIG. 5 is an explanatory diagram illustrating an example of change of an imaged image by the notification processing according to an embodiment of the present disclosure being performed. FIG. 5 illustrates an example of changing the imaged image by the information processing device 100 superimposing a notification object on the action region MA1 (the action region regarding which determination has been made that the user has performed a predetermined action) of the imaged image. Here, in FIG. 5, an example is illustrated where the information processing device 100 superimposes multiple shining stars on the imaged image, but the notification object according to an embodiment of the present disclosure is not restricted to the above-described. The user can visually comprehend that the information processing device 100 has determined that the user has performed a predetermined action in the action region MA, by seeing the change in the imaged image displayed on the display screen.

Figure 6:
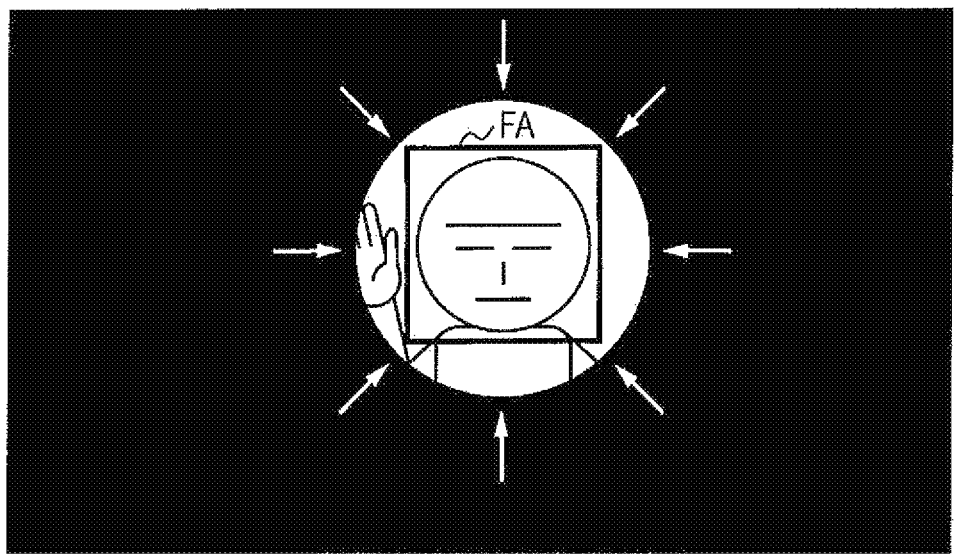
FIG. 6 is an explanatory diagram illustrating another example of change of an imaged image due to notification processing according to an embodiment of the present disclosure being performed.

Note that the change in the imaged image due to notification processing according to an embodiment of the present disclosure being performed is not restricted to the notification object shown in FIG. 5 being superimposed. FIG. 6 is an explanatory diagram illustrating another example of change of the imaged image due to the notification processing according to an embodiment of the present disclosure being performed. As shown in FIG. 6, the imaged image may be changed by highlight processing using a round mask or the like being performed toward the face region FA corresponding to the action region regarding which determination has been made that the user has performed the predetermined action in the imaged image. In this case as well, the user can visually comprehend that the information processing device 100 has determined that the user has performed a predetermined action in the action region MA, by seeing the change in the imaged image displayed on the display screen.

The information processing device 100 visually notifies that determination has been made that a predetermined action has been made, by changing the imaged image displayed on the display screen as described above, for example. Accordingly, the user can cancel execution of the processing corresponding to the action at the information processing device 100 by stopping his/her own action, so the information processing device 100 can prevent processing which the user does not intend due to erroneous detection from being executed, and user convenience and operability can be further improved.

Figure 7:
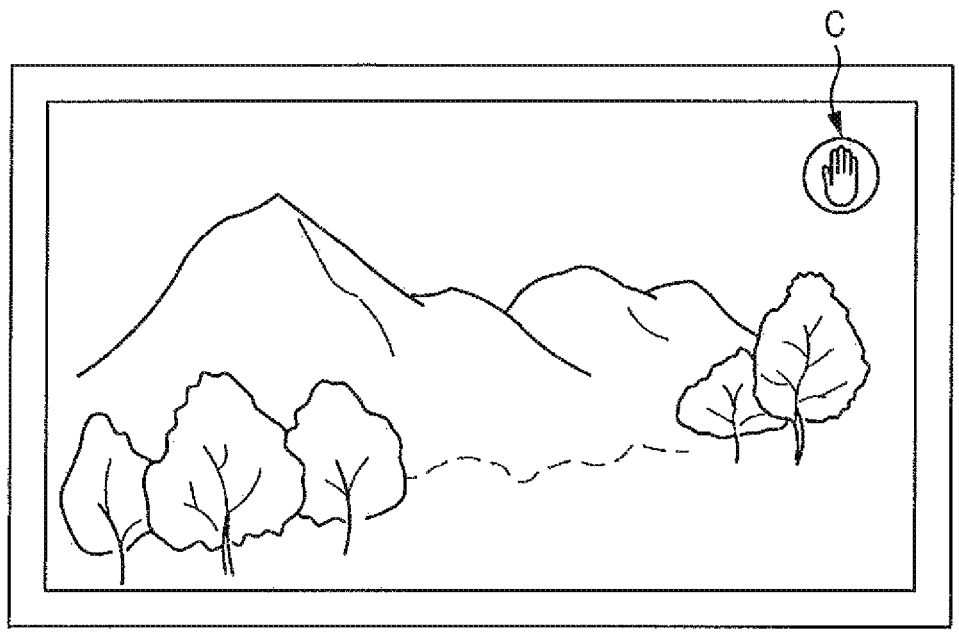
FIG. 7 is an explanatory diagram illustrating another example of notification to a user due to notification processing according to an embodiment of the present disclosure being performed.
Figure 8:
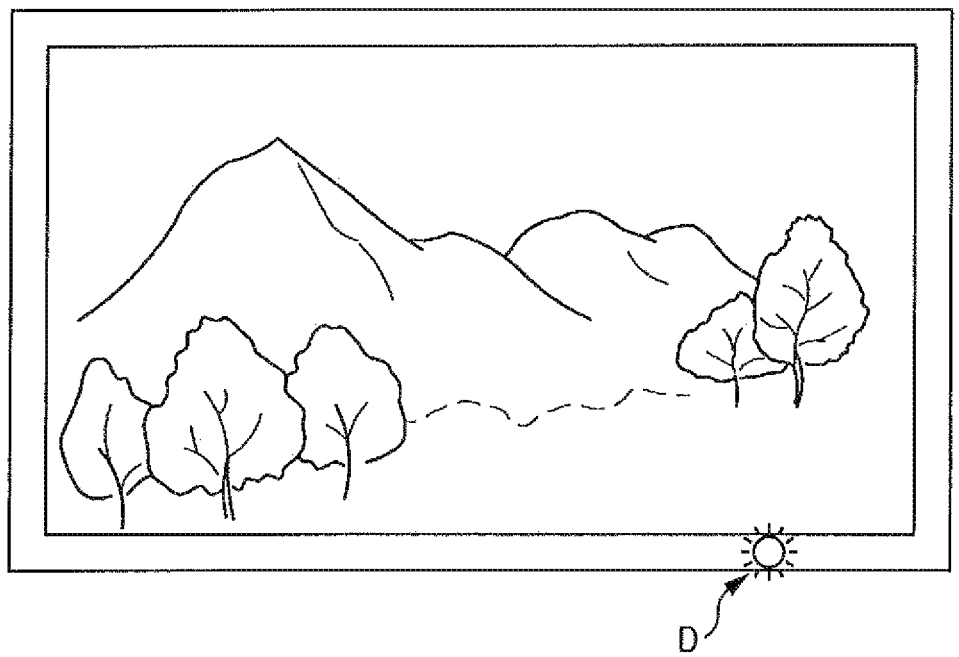
FIG. 8 is an explanatory diagram illustrating another example of notification to a user due to notification processing according to an embodiment of the present disclosure being performed.

Note that notification to the user by notification processing according to an embodiment of the present disclosure being performed is not restricted to changing the imaged image displayed in the display screen as shown in FIGS. 4 through 6. FIGS. 7 and 8 are explanatory diagrams illustrating other examples of notification user by notification processing according to an embodiment of the present disclosure being performed.

As indicated by C in FIG. 7, the information processing device 100 can change the image by superimposing an icon on an image displayed on a display screen, such as an image illustrating contents for example. Note that the method for changing an image displayed on the display screen according to an embodiment of the present disclosure is not restricted to superimposing the icon shown in FIG. 7. For example, the information processing device 100 may superimpose various objects, such as an indicator displaying time in stages from detecting the predetermined action by the user till starting the processing corresponding to the predetermined action, or the like, on the image displayed on the display screen. Also, the information processing device 100 may display the object such as an icon or indicator outside of the display region where the image indicating the content on the display screen, rather than superimposing the object on the image displayed on the display screen. In the above case as well, the user can visually comprehend that the information processing device 100 has determined that the user has performed a predetermined action in the action region MA, by seeing the change in the imaged image displayed on the display screen.

Also, as indicated by D in FIG. 8, visual notification can be made that determination has been made that a predetermined action has been performed, by a lighting device such as an LED (Light Emitting Diode) provided on the outer portion of the display screen being selectively lit (or turned off). Also, the information processing device 100 can make visual notification that determination has been made that a predetermined action has been performed, by changing the color of light emitted from the lighting device. As described above, the user can visually comprehend that the information processing device 100 has determined that the user has performed a predetermined action in the action region MA, by the information processing device 100 changing the lit state of the lighting device which an external device such as a display device or a display unit (later described) which the information processing device 100 has.

As described above for example, the information processing device 100 can visually notify that determination has been made that a predetermined action has been performed, by changing the image displayed on the display screen, or changing the lit state of the lighting device. Note that while changing of the image displayed on the display screen (including the imaged image) and changing the lit state of the lighting device have been illustrated individually in the above description, but It goes without saying that the information processing device 100 according to an embodiment of the present disclosure can make visual notification by combining these.

The information processing device 100 visually notifies the user (or notifies to an external device) as described above for example, that the information processing device 100 has determined that a predetermined action has been performed by the user in an action region MA, by performing notification processing. Also, in the event that a predetermined action is performed continuously from a predetermined period from determination having been made that the predetermined action has been made, the information processing device 100 performs processing corresponding to the predetermined action in the later-described processing of (V) (execution processing). Accordingly, the user can cancel execution of the processing corresponding to the action at the information processing device 100 by stopping his/her own action, so the information processing device 100 can prevent processing which the user does not intend due to erroneous detection from being executed, and user convenience and operability can be further improved. Note that while an example of the information processing device 100 visually notifying the user by performing notification processing has been illustrated above, It goes without saying that eh same advantages can be obtained even in cases of performing notification by other methods, such as a case of the information processing device 100 audibly performing notification by performing notification processing.

(V) Execution Processing

Upon determination being made in the processing of (III) above (action determination processing) that a predetermined action has been performed continuously for a predetermined period since determination was made that the predetermined action was performed, the information processing device 100 performs processing corresponding to the determined predetermined action. Now, the information processing device 100 performs processing corresponding to the determined predetermined action, in the same way as with the processing of (4) above (execution processing).

As the second processing relating to the first operability improvement approach, the information processing device 100 performs the processing of (I) (face region detection processing) through (V) (execution processing) described above, thereby determining that a predetermined action has been performed by the user, and performing processing corresponding to the predetermined action.

Now, the second processing relating to the first operability improvement approach has basically the same processing as the first processing relating to the first operability improvement approach. Accordingly, by performing the second processing relating to the first operability improvement approach, the information processing device 100 prevent deterioration in user convenience which can occur in the event of using the related art, and also improvement in user operability can be improved, in the same way as performing the first processing relating to the first operability improvement approach.

Also with the second processing relating to the first operability improvement approach, the information processing device 100 notifies the user (or notifies to an external device) that the information processing device 100 has determined that a predetermined action has been performed by the user in an action region MA, by the processing of (IV). Also, in the event that a predetermined action is performed continuously from a predetermined period from determination having been made that the predetermined action has been made, the information processing device 100 performs processing corresponding to the predetermined action in the processing of (V) (execution processing). Accordingly, the user can cancel execution of the processing corresponding to the action at the information processing device 100 by stopping his/her own action, so the user can control execution of processing corresponding to the predetermined action at the information processing device 100 by his/her own actions. Accordingly, the information processing device 100 can prevent processing which the user does not intend due to erroneous detection from being executed, and user convenience and operability can be further improved.

1-2. Second Operability Improvement Approach: Approach Relating to Cooperative Processing By performing the above-described first operability improvement approach, the information processing device 100 can perform processing based on a predetermined action performed by the user, while preventing deterioration of user convenience and improving user operability. Now, as described above, in the event that each of multiple information processing devices performing communication are to perform processing corresponding to a predetermined action performed by a user, there is concern that an undesirable situation may occur due to processing corresponding to a user action being performed at one information processing device of the information processing devices that are performing communication. Accordingly, next, description will be made regarding a second operability improvement approach according to the present disclosure, capable of preventing deterioration of user convenience and improving user operability in a communication system whereby multiple information processing devices 100 can perform communication (hereinafter also referred to as "communication system 1000").

Now, while examples of a communication system 1000 according to an embodiment of the present disclosure include communication relating to a call by imaged images and audio (e.g., videoconferencing), communication with the communication system 1000 is not restricted to the above-described. For example, the information processing devices 100 making up the communication system 1000 can perform various types of communication, such as communication relating to calls by audio, communication relating to execution of applications such as game software, business software, and so forth.

Each information processing device 100 making up the communication system 1000 according to the second operability improvement approach perform processing cooperatively to prevent an undesirable situation from occurring due to processing corresponding to a user action being performed at one information processing device of the information processing devices that are performing communication. More specifically, the information processing device 100 performs the processing of (i) through the processing of (v) below, for example, to perform processing cooperatively between information processing devices 100 which are performing communication, and improve user operability of the communication system 1000.

(i) Face Detection Processing

In the same way as with the processing of (1) above (face region detection processing), the information processing device 100 detects the face of the user from in the imaged image, and determines the face region FA.

(ii) Action Region Setting Processing

Upon the face region being detected in the processing of (i) above (face region detection processing), the information processing device 100 sets action regions MA nearby the face region FA, based on the face region FA, in the same way as with the processing of (2) above (action region setting processing).

(iii) Action Determination Processing

Upon setting of the processing of action regions MA in (ii) above (action region detection processing), the information processing device 100 determines that a predetermined action by the user has been performed in an action region MA, based on the imaged image and reference detection information or individual detection information, in the same way as with the processing of (3) above (action determination processing).

Also, in the same way as with the processing of (III) above (action determination processing), the information processing device 100 determines whether or not a predetermined action has been continuously performed for a predetermined period from determination having been made that the predetermined action has been performed. In the case described above, in the event that determination is made in the processing of (iii) (action determination processing) for example, that a predetermined action has been continuously performed for the predetermined period, determination is made in later-described processing of (iv) (cooperation determination processing) regarding whether or not to perform processing cooperatively.

Also, in the event of the information processing device 100 performing processing the same as with the processing of (III) above (action determination processing), notification processing the same as with the processing of (IV) above (notification processing) may further be performed. An example of the information processing device 100 performing notification processing as processing relating to the second operability improvement approach will be described later.

Moreover, in the event that determination is made that a predetermined action has been performed, the information processing device 100 may further determine whether or not the predetermined action is an action for cooperatively performing with communication object devices. The information processing device 100 performs the above determination based on information indicating whether or not the predetermined action is an action for cooperation (e.g., a flag or the like), recorded in each of the reference detection information and individual detection information, for example.

In the event of further determining in the processing of (iii) (action determination processing) whether or not the predetermined action is an action for cooperatively performing with communication object devices, the information processing device 100 selectively performs later-described processing of (iv) (cooperation determination processing) if determination is not made that the action is an action for cooperatively performing, for example. Also, in the above determination, if determination is not made that the action is an action for cooperatively performing, the information processing device 100 performs processing corresponding to the determined predetermined action in the later-described processing of (v) (execution processing), for example, in the same way as with the processing of (4) above (execution processing).

By further determining whether or not the predetermined action determined by the information processing device 100 is an action for cooperatively performing with communication object devices, as described above for example, the information processing device 100 can selectively switch between the above-described processing relating to the first operability improvement approach and processing relating to the second operability improvement approach. Accordingly. In the above case, the information processing device 100 can distinguish between processing to be performed by itself and processing to be performed cooperatively with communication object devices, in accordance with a predetermined action performed by the user, and execute processing accordingly, so user convenience and operability can further be improved.

(iv) Cooperation Determination Processing

In the event that determination has been made in the processing of (iii) above that the user has performed a predetermined action in a set action region MA, determination is made regarding whether or not to perform processing cooperatively with communication object devices, based on cooperation control information. More specifically, in the event that the cooperation control information does not indicate performing processing cooperatively, the information processing device 100 does not make determination to perform processing cooperatively. Also, in the event that the cooperation control information indicates performing processing cooperatively, the information processing device 100 makes determination to perform processing cooperatively.

Now, cooperation control information according to an embodiment of the present disclosure is information (data) generated based on the determination results of a predetermined action of a user at the device itself, and the determination results of a predetermined action of a user of a communication object device at the communication object device. Cooperation control information includes, for example, information indicating whether or not to perform processing cooperatively (e.g., flag), information indicating the contents of the processing to be executed, information indicating the time at which to start executing the processing, and so forth. Note that information included in the cooperation control information according to an embodiment of the present disclosure is not restricted to the above-described. For example, the cooperation control information may include, information identifying the information processing device 100 to be controlled, such as for example, MAC (Media Access Control) address, unique ID of the information processing device 100, and so forth.

Also, the cooperation control information is generated by, for example, a cooperation control server (hereinafter also referred to as "cooperation control server 200") making up the communication system 1000, or an information processing device 100 having functions of a cooperation control server 200. The processing relating to generating cooperation control information will be described later with reference to FIG. 9.

(v) Execution Processing

The information processing device 100 selectively performs processing based on the cooperation control information, based on the determination results in the processing of (iv) above (cooperation determination processing).

More specifically, in the event that determination is made to perform processing cooperatively with communication object devices in the processing of (iv) above (cooperation determination processing), the information processing device 100 performs processing based on the cooperation control information as processing corresponding to the predetermined action determined in the processing of (iii) above (action determination processing). Also, in the event that determination is not made to perform processing cooperatively with communication object devices in the processing of (iv) above (cooperation determination processing), the information processing device 100 does not perform processing corresponding to the predetermined action determined in the processing of (iii) above (action determination processing).

The information processing device 100 performs the processing of (i) (face detection processing) through the processing of (v) (execution processing), for example, as processing relating to the second operability improvement approach, so as to perform processing cooperatively with communication object devices. Now, in the event that determination is not made to perform processing cooperatively with communication object devices in the processing of (iv) above (cooperation determination processing), even if determination is made in the processing of (iii) above (action determination processing) that a predetermined action has been performed, the information processing device 100 does not perform processing corresponding to the predetermined action that has been determined. Accordingly, by the processing of (i) (face region detection processing) through the processing of (v) (execution processing) above being performed, an undesirable situation can be prevented from occurring due to processing corresponding to a user action being performed at one information processing device of the information processing devices that are performing communication.

Also, in the same way as with the processing according to the first operability improvement approach described above, in the event that determination is made that the user has performed a predetermined action in a set action region MA, the information processing device 100 performs processing corresponding to the action. Accordingly, by performing the processing of (i) (face region detection processing) through the processing of (v) (execution processing), the information processing device 100 can improve user convenience and operability in the same way as with the processing relating to the first operability improvement approach described above.

Accordingly, by performing the processing of (i) (face region detection processing) through the processing of (v) (execution processing), the information processing device 100 can prevent deterioration of user convenience and improve user operability in the communication system 1000.

Overview of Processing Relating to Second Operability Improvement Approach

Figure 9:
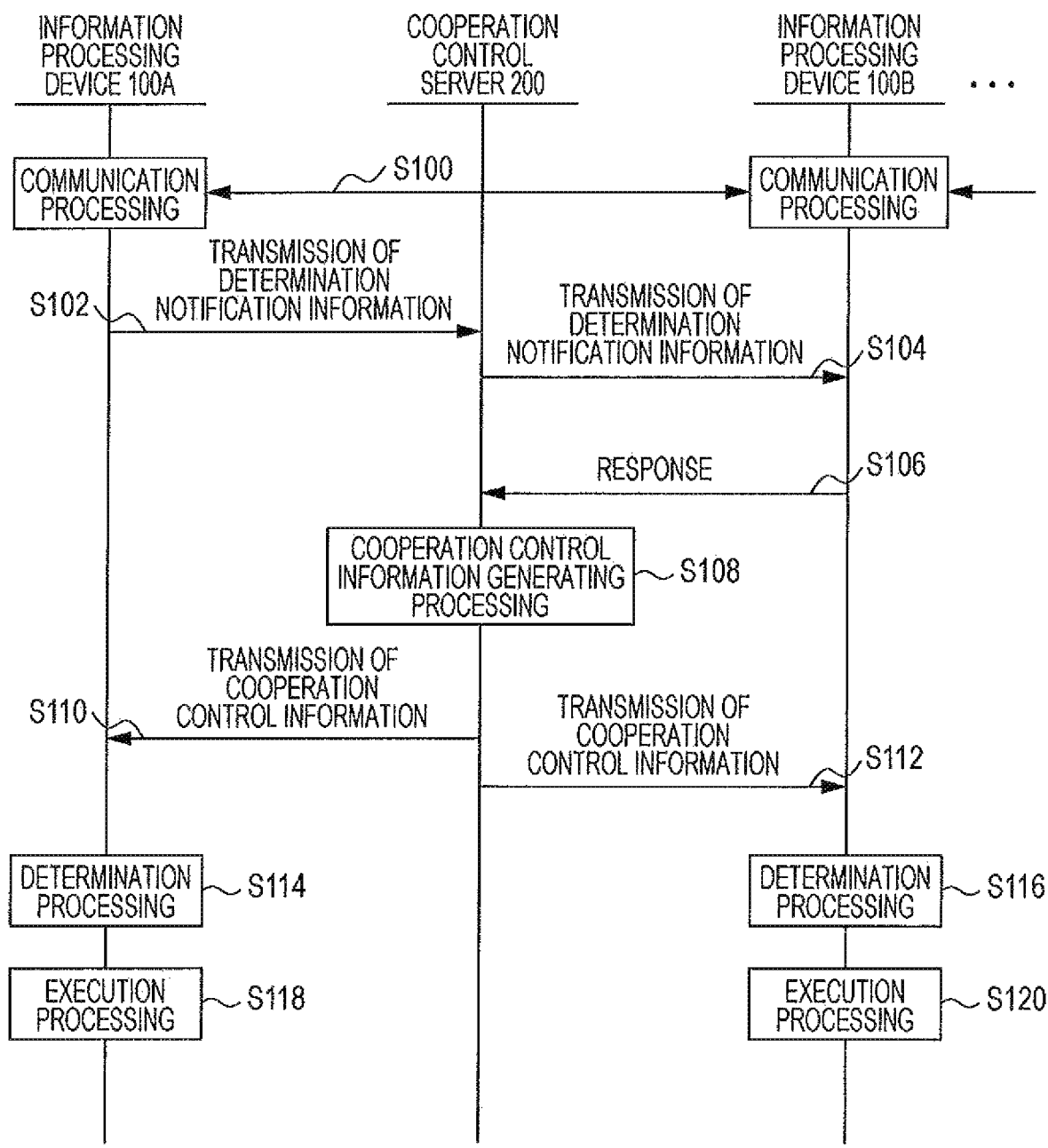
FIG. 9 is an explanatory diagram for describing the overview of processing relating to a second operability improvement approach with a communication system according to an embodiment of the present disclosure.

Now, the overview of processing relating to the second operability improvement approach with the communication system 1000 will be described with reference to an example of a cooperation control server 200 generating cooperation control information. FIG. 9 is an explanatory diagram for describing the overview of the processing of the second operability improvement approach in the communication system 1000 according to an embodiment of the present disclosure. FIG. 9 illustrates an example of processing in a case where multiple information processing devices 100

(information processing device 100A, information processing device 100B, . . . ) making up the communication system 1000 are performing communication. In the following the overview of processing relating to the second operability improvement approach will be described with a case of two information processing devices 100 of an information processing device 100A and an information processing device 100B performing communication as a primary example, for the same of convenience of description.

In the event that determination is made in a state of the information processing device 100A and the information processing device 100B performing communication (S100) that a user has performed a predetermined action in an action region MA which the information processing device 100A has set, the information processing device 100A transmits determination notification information to the cooperation control server 200 (S102).

Now, the determination notification information according to an embodiment of the present disclosure is information (data) for notifying that determination has been made that a predetermined action has been performed, and includes generated information indicating the information processing device 100 such as a MAC address or the like, information indicating the determined predetermined action, and so forth, for example. It goes without saying that the information included in the determination notification information according to an embodiment of the present disclosure is not restricted to the above-described.

The cooperation control server 200 which has received the determination notification information transmitted from the information processing device 100A in step S102 transmits the received determination notification information to the information processing device 100B which is the communication object of the information processing device 100A (S104). Note that in FIG. 9, an example is illustrated where the information processing device 100B receives the determination notification information which the information processing device 100A has transmitted via the cooperation control server 200, but the processing in the communication system 1000 is not restricted to the above-described. For example, in the event of determining that the predetermined processing has been performed at the device itself, the information processing device 100A may transmit the determination notification information to the information processing device 100B without going through the cooperation control server 200.

The information processing device 100B which has received the determination notification information transmitted from the cooperation control server 200 in step S104 performs the processing of (i) (face region detection processing) through the processing of (iii) (action determination processing) described above, and determines whether or not the user has performed a predetermined action. The information processing device 100B then makes a response corresponding to the determination results of the above determination to the cooperation control server 200 (S106). More specifically, in the event of determining that the predetermined action has been performed at the device itself, the information processing device 100B transits determination notification information to the cooperation control server 200 as a response. Note that the information processing device 100B may transmit the determination notification information to the information processing device 100A which is the communication object, for example. Also, in the event of not determining that the predetermined action has been performed at the device itself, the information processing device 100B transits a response to the cooperation control server 200 to the effect that cooperative processing will not be performed. That is to say, the response of the information processing device 100B in step S106 matches the determination results of the predetermined action of the user at the information processing device 100B (the communication object device as viewed from the information processing device 100A). Note that a specific example of processing at an information processing device 100 in a case of having received a determination notification information transmitted from a communication object device will be described later.

The cooperation control server 200 which has received the response transmitted from the information processing device 100B in step S106 generates cooperation control information based on the determination notification information received from the information processing devices 100 in step S102, and the response received from the information processing device 100B in step S106 (S108: cooperation control information generating processing).

More specifically, in the event that the response received from the information processing device 100B in step S106 is determination notification information, the cooperation control server 200 identifies processing corresponding to the combination of the predetermined actions which the determination notification information of the information processing devices 100A and 100B each indicate. The cooperation control server 200 then generates cooperation control information for causing the information processing devices 100A and 100B to execute the identified processing cooperatively.

Now, the cooperation control server 200 performs the above-described cooperation determination processing using cooperation management information (e.g., a database) in which is recorded information indicating combinations of predetermined actions and the contents of the processing, for example. Also, the cooperation control server 200 uses cooperation management information in which is recorded processing correlated with the meaning of predetermined actions, as the contents of the processing to be executed, for example. Accordingly, by the cooperation control server 200 generating cooperation control information using cooperation management information such as described above, the information processing devices 100 can perform processing correlated with the meaning of the detected action (processing taking affordance into consideration). The cooperation management information may be stored in a storage unit (not shown) which the cooperation control server 200 has, or may be obtained by the cooperation control server 200 from an external device such as server (not shown), for example.

In the event of having received determination notification information transmitted from all information processing devices 100 performing communication, for example, the cooperation control server 200 determines to cause the information processing devices 100 performing communication to perform the processing cooperatively, but the cooperation control information generating processing at the cooperation control server 200 is not restricted to the above-described. For example, an arrangement may be made wherein, in the event that the cooperation control server 200 receives determination notification information transmitted from information processing devices 100 of a number of a predetermined threshold or greater (or a number exceeding the threshold), determination is made to cause the information processing devices 100 performing communication to perform the processing cooperatively. Now, while the above predetermined threshold relating to the cooperation determination processing is set by the user of the cooperation control server 200 for example (e.g., the administrator of the communication system 1000), this may be a preset number.

Also, in the event that the response received from the information processing device 100B in step S106 is a response to the effect that cooperative processing will not be performed, the cooperation control server 200 generates cooperation control information for not causing the information processing devices 100A and 100B to perform processing corresponding to the predetermined action.

Upon generating the cooperation control information in step S108, the cooperation control server 200 transmits the generated cooperation control information to each of the information processing device 100A and the information processing device 100B (S100, S112).

The information processing device 100A which has received the cooperation control information transmitted from the cooperation control server 200 in step S110 determines whether or not to perform processing cooperatively with the information processing device 100B (communication object device) based on the received cooperation control information (S114). The information processing device 100A perform the determination of step S114 based on information indicating whether or not to perform the processing included in the cooperation control information cooperatively, for example. Now, the processing in steps S102 and S114 shown in FIG. 9 are equivalent to the processing of (iv) above (cooperation determination processing).

Also, the information processing device 100B which has received the cooperation control information transmitted from the cooperation control server 200 in step S112 determines whether or not to perform processing cooperatively with the information processing device 100A (communication object device) based on the received cooperation control information (S116), in the same way as with the processing of step S114 at the information processing device 100A.

Here, the information processing device 100A and information processing device 100B perform the determination of steps S114 and S116 based on the cooperation control information generated by the cooperation control server 200 in step S108. Accordingly, the determination results of step S114 at the information processing device 100A and the determination results of step S116 at the information processing device 100B match.

Based on the determination results in step S114, the information processing device 100A selectively performs processing based on the cooperation control information (S118). Also, based on the determination results in step S116, the information processing device 100B selectively performs processing based on the cooperation control information (S120). As described above, the determination results of step S114 at the information processing device 100A and the determination results of step S116 at the information processing device 100B match. Accordingly, with the communication system 1000, processing where the information processing device 100A and information processing device 100B cooperate is realized by the information processing device 100A and information processing device 100B each determining whether or not to perform processing with the communication object device based on the cooperation control information.

Due to processing such as shown in FIG. 9 being performed for example, at the communication system 1000, cooperative processing based on the cooperation control information is selectively performed at the multiple information processing devices 100 performing communication.

Accordingly, at the communication system 1000, an undesirable situation can be prevented from occurring due to processing corresponding to a user action being performed at one information processing device of the information processing devices that are performing communication, such as described above. Also, with the communication system 1000, in the event that determination is made that the user has performed a predetermined action in an action region MA that has been set, the information processing devices 100 perform processing corresponding to the action, in the same way as with the processing relating to the first operability improvement approach described above. Accordingly, the information processing devices 100 making up the communication system 1000 can improve user convenience and operability.

Note that while FIG. 9 describes the overview of processing relating to the second operability improvement approach at the communication system 1000 by way of an example of a case where the cooperation control server 200 generates cooperation control information, the processing relating to the second operability improvement approach at the communication system 1000 according to an embodiment of the present disclosure is not restricted to the example shown in FIG. 9. For example, any of the information processing devices 100 making up the communication system 1000, such as the information processing device 100A, information processing device 100B, in FIG. 9, or the like, for example, may have the functions of the cooperation control server 200. In the above case as well, the information processing devices 100 making up the communication system 1000 can selectively perform cooperative processing based on cooperation control information.

Figure 10:
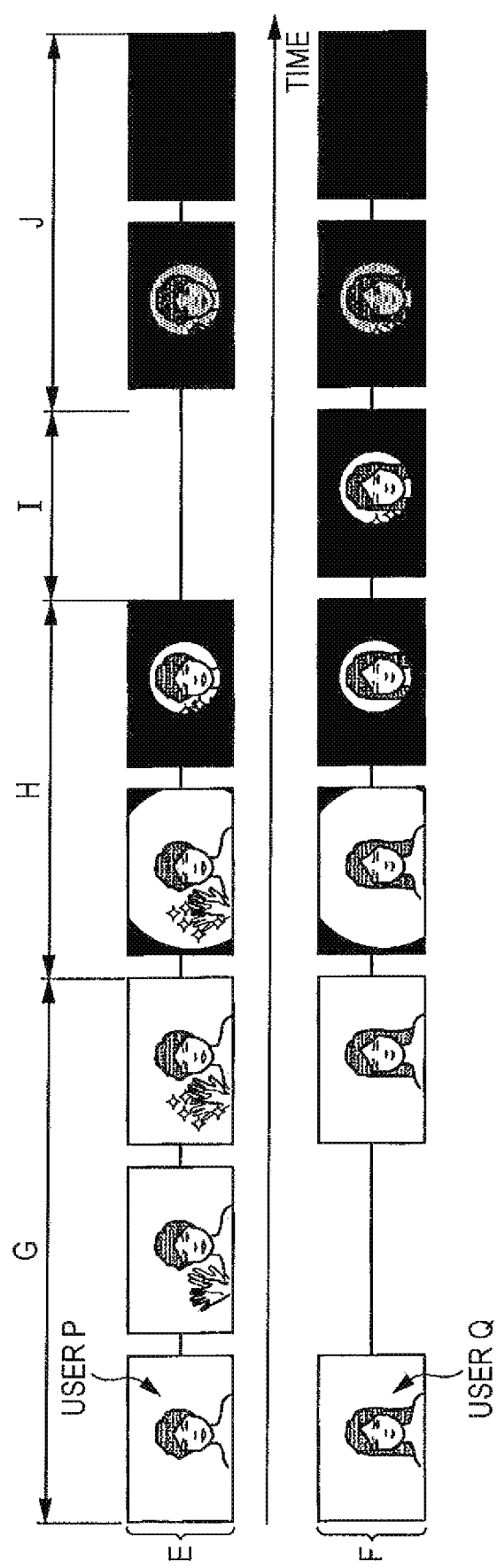
FIG. 10 is an explanatory diagram illustrating an application example of processing of relating to the second operability improvement approach with a communication system according to an embodiment of the present disclosure.

Application Example of Processing Relating to Second Operability Improvement Approach FIG. 10 is an explanatory diagram illustrating an application example of processing relating to the second operability improvement approach with the communication system 1000 according to an embodiment of the present disclosure. Now, FIG. 10 illustrates an example of a user P and a user Q performing a video call each using information processing devices 100, in which the call is ended by both the user P and user Q performing a bye-bye action (an example of a predetermined action). The series of images denoted by E in FIG. 10 indicate the images which the user Q is seeing (e.g., images displayed on the display screen of the information processing device 100 which the user Q has, or images which the information processing device 100 displays on a display screen of an external device). Also, the images denoted by F in FIG. 10 indicate the images which the user P is seeing (e.g., images displayed on the display screen of the information processing device 100 which the user P has, or images which the information processing device 100 displays on a display screen of an external device).

Upon the user P and user Q performing a bye-bye action during the call (G in FIG. 10), the fact that the user P has performed a bye-bye action is notified to the user P and user Q (H in FIG. 10). At this time, at the communication system 1000, determination has only been made that the predetermined action has been performed just at the one information processing device 100 corresponding to the user P, so the communication relating to the video call is not ended.

Subsequently, upon the user Q performing the bye-bye action as the predetermined action (I in FIG. 10), cooperation control information for ending the communication relating to the video call is generated. The information processing device 100 corresponding to the user P and the information processing device 100 corresponding to the user Q both perform processing based on the generated cooperation control information, whereby the communication relating to the video call between the user P and the user Q is ended (J in FIG. 10).

For example, as shown in FIG. 10, in the event that determination is made at the communication system 1000 that the users of each of the information processing devices 100 performing communication have performed a predetermined action, the processing corresponding to the predetermined action is executed at each of the information processing devices 100. Accordingly, with the communication system 1000, an undesirable situation can be prevented from occurring due to processing corresponding to a user action being performed at one information processing device of the information processing devices that are performing communication, such as described above.

Also, the information processing device 100 which performs the processing relating to the second operability improvement approach is capable of performing processing correlated with the meaning of the predetermined actions which are determined, in the same way as with the information processing device 100 which performs the processing relating to the first operability improvement approach. Accordingly, the event that the communication at the information processing device 100 is communication relating to a video call such as shown in FIG. 10, the users making the call can end the call by performing a natural action such as a parting gesture in the same way as when directly talking at the same place. Accordingly, user convenience and operability can be improved by performing processing relating to the second operability improvement approach.

Accordingly, a communication system capable of improving user convenience and operability is realized by the information processing device 100 performing the processing relating to the second operability improvement approach. Note that while description has been made above with reference to an example of a case where the communication at the communication system 1000 is communication relating to a video call as shown in FIG. 10, It goes without saying that examples of application of the processing relating to the second operability improvement approach at the communication system 1000 according to an embodiment of the present disclosure are not restricted to the example shown in FIG. 10.

Specific Examples of Processing Relating to Operability Improvement Approaches

Next, processing for realizing the first operability improvement approach and processing for realizing the second operability improvement approach according to an embodiment of the present disclosure will be described in further detail.

Figure 11:
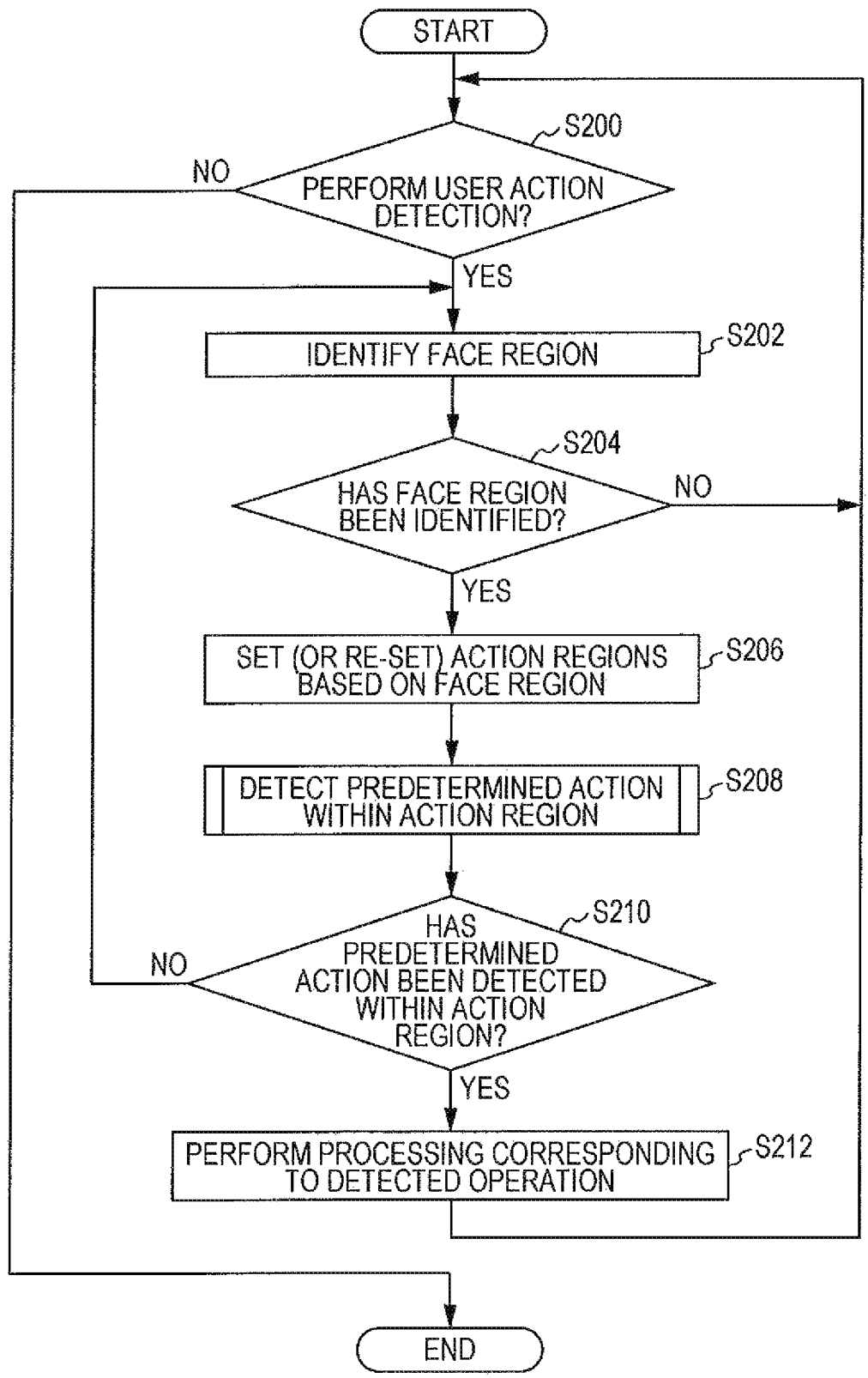
FIG. 11 is a flowchart illustrating an example of processing relating to the first operability improvement approach with the information processing device according to an embodiment of the present disclosure.

1-1-1-1. Specific Example of First Processing Relating to First Operability Improvement Approach FIG. 11 is a flowchart illustrating an example of processing relating to the first operability improvement approach at an information processing device 100 according to an embodiment of the present disclosure, and illustrates an example of processing corresponding to the first processing relating to the first operability improvement approach. In the following, description will be made with reference to an example of processing in a case of the information processing device 100 determining a predetermined action made by a user, based on periodic components in an action region MA set as to the imaged image.

The information processing device 100 determines whether or not to perform action detection of the user (S200). Now, in a case there have been provided functions for selectively switching between a first processing mode where the information processing device 100 performs action detection and a second processing mode where action detection is not performed for example, based on user operations and the like, the processing in step S200 is equivalent to determination of whether or not the processing mode is the first processing mode. That is to say, in the event that the information processing device 100 does not have a function for switching between the first processing mode and the second processing mode, the information processing device 100 does not have to perform the processing of step S200.

In the event that determination is not made to perform action detection of the user in step S200, the information processing device 100 ends the processing relating to the operability improvement approach. Note that the processing relating to the first operability improvement approach in FIG. 11 is not processing of a type which is not performed again once it is ended, rather, the information processing device 100 can periodically/non-periodically repeat the processing relating to the first operability improvement approach shown in FIG. 11 even though the processing ends for the time being.

Also, in the event that determination is made to perform action detection of the user in step S200, the information processing device 100 performs face detection based on the input imaged image, and identifies a face region FA (S202). Now, the processing in step S202 corresponds to the processing of (1) above (face region detection processing). Also, the information processing device 100 identifies the face region FA by detecting feature points such as, for example, the user's eyes, nose, mouth, structure, and so forth, and detecting regions similar to the face brightness distribution and structure pattern; however, the method for identifying the face region FA is not restricted to the above-described.

Also, in the event that multiple face regions FA are identified from the imaged image, such as cases where there are multiple users in the imaged image, the information processing device 100 performs the processing of the later-described steps S204 through S212, for each of the identified multiple face regions FA.

Upon performing the processing of step S202, the information processing device 100 determines whether or not a face region FA has been identified (S204). In the event that determination is not made that a face region FA has been identified in step S204, the information processing device 100 repeats the processing from step S200.

Also, in the event that determination is made that a face region FA has been identified in step S204, the information processing device 100 sets action regions MA based on the face region FA (S206). Now, the processing in step S206 corresponds to the processing of (2) above (action region setting processing). Also, the information processing device 100 sets the action regions MA nearby the face region FA as shown in FIGS. 1 and 2 for example, but the action regions MA set by the information processing device 100 are not restricted to the examples shown in FIGS. 1 and 2.

Upon action regions MA being set (or re-set) in step S206, the information processing device 100 detects predetermined actions in the set action regions MA (S208). The information processing device 100 then determines whether or not a predetermined action has been detected within the set action regions MA (S210). Here, the processing of steps S208 and S210 corresponds to the processing of (3) above (action determination processing).

More specifically, in step S208 the information processing device 100 detects whether or not a predetermined action has been performed, based on detection results of periodic components in the action regions MA set based on the imaged image, and periodic component information of reference detection information, for example (equivalent to first example of action determination processing described above). Now, the reference detection information is stored in a storage unit (described later) which the information processing device 100 has, for example, with the information processing device 100 reading out the reference detection information from this storage unit to perform the above-described detection, but the processing at the information processing device 100 according to an embodiment of the present disclosure is not restricted to the above-described. For example, the information processing device 100 may perform communication with an external device such as a server storing reference detection information, and obtain reference detection information from the external devices, so as to perform the detection using the obtained reference detection information.

Note that the processing of step S208 at the information processing device 100 according to an embodiment of the present disclosure is not restricted to processing using reference detection information. For example, the information processing device 100 may perform processing using reference detection information or individual detection information as the processing of step S208, as illustrated in the second example of the action determination processing described above.

Figure 12:
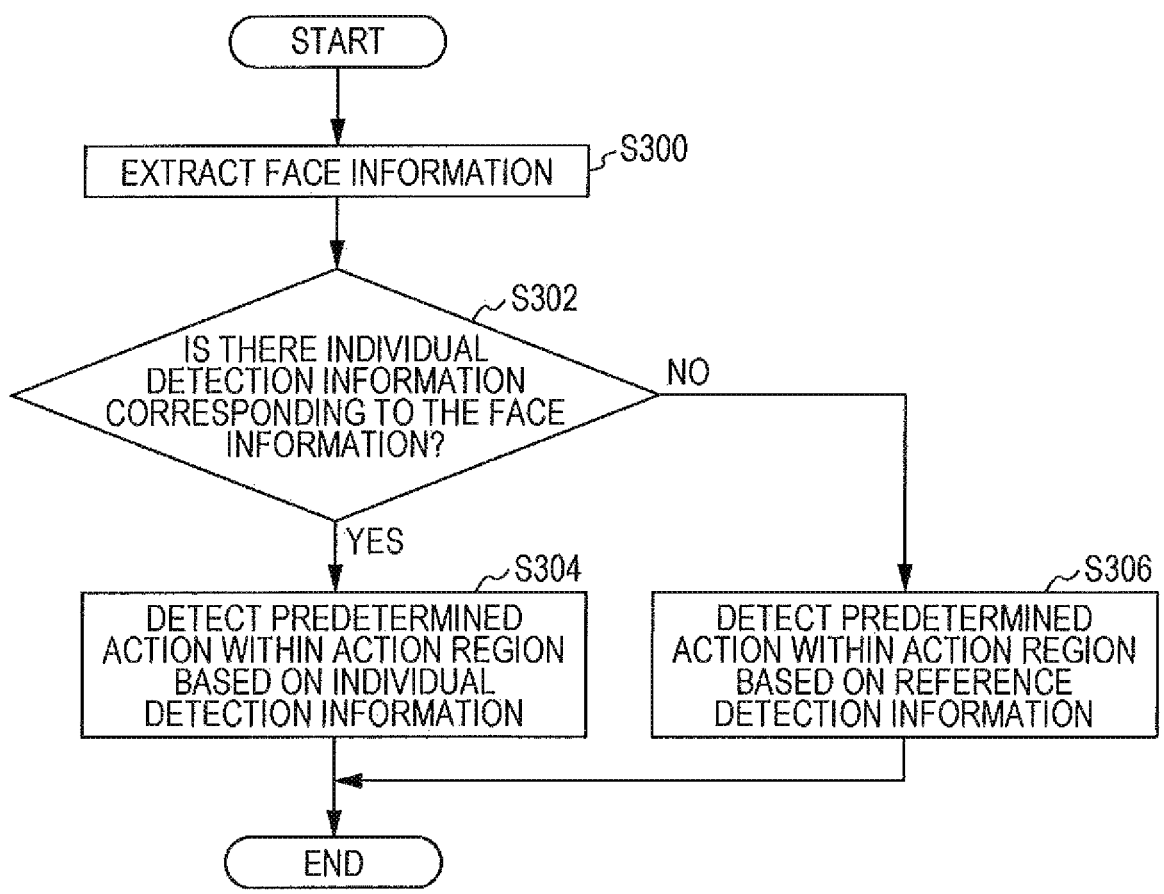
FIG. 12 is a flowchart illustrating an example of action determination processing with the information processing device according to an embodiment of the present disclosure.

FIG. 12 is a flowchart illustrating an example of action determination processing at the information processing device 100 according to an embodiment of the present disclosure. Here, FIG. 12 illustrates an example of processing equivalent to the second example of the action determination processing described above.

The information processing device 100 extracts face information from the face region FA (S300). The information processing device 100 then determines whether or not there is face information in the individual detection information that corresponds to the extracted face information (S302).

Now, the individual detection information is stored in a storage unit (described later) which the information processing device 100 has, for example, with the information processing device 100 reading out the individual detection information from this storage unit and performing the above-described determination processing, but the processing at the information processing device 100 according to an embodiment of the present disclosure is not restricted to the above-described. For example, the information processing device 100 may perform communication with an external device such as a server storing individual detection information, and obtain individual detection information from the external devices, so as to perform the detection using the obtained individual detection information. Also, the information processing device 100 may transmit the face information extracted in step S300 to an external device storing the individual detection information so as to cause the external device to perform actual determination regarding whether or not there is face information in the individual detection information corresponding to the extracted face information, and obtain the determination results from the external device. In the above case as well, the information processing device 100 can perform the processing of step S302 based upon the determination results obtained from the external device.

In the event that determination is made in step S302 that there is face information in the individual detection information corresponding to the extracted face information, the information processing device 100 detects that a predetermined action has been performed, based on the detection results of periodic components in the action region MA set based on the imaged image, and periodic component information of the individual detection information in which is included the face information corresponding to the extracted face information.

Also, in the event that determination is not made in step S302 that there is face information in the individual detection information corresponding to the extracted face information, the information processing device 100 detects that a predetermined action has been performed, based on the detection results of periodic components in the action region MA set based on the imaged image, and periodic component information of the reference detection information.

By performing the processing shown in FIG. 12 for example, the information processing device 100 can detect that a predetermined action has been performed using the reference detection information or individual detection information.

Also, by the information processing device 100 detecting that a predetermined action has been performed using the individual detection information, the information processing device 100 can prevent erroneous detection or excessive detection of predetermined actions of users corresponding to the face information included in the individual detection information.

Figure 13:
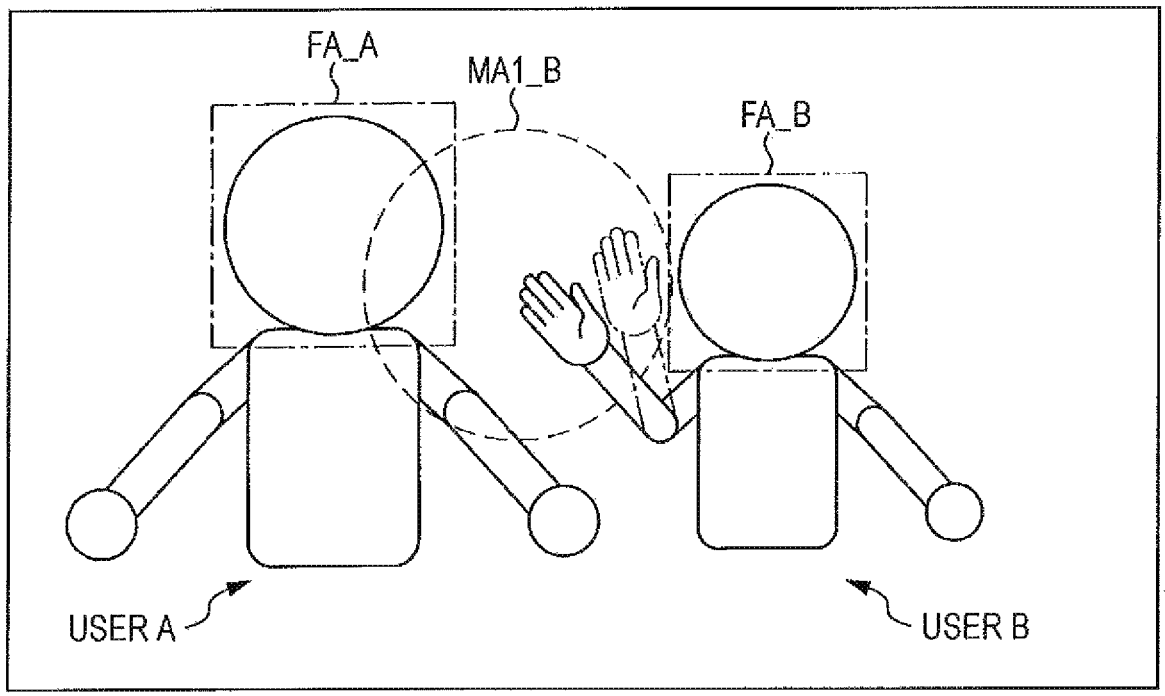
FIG. 13 is an explanatory diagram for describing advantages of detecting that a predetermined action has been performed using individual detection information, by the information processing device according to an embodiment of the present disclosure.
Figure 14:
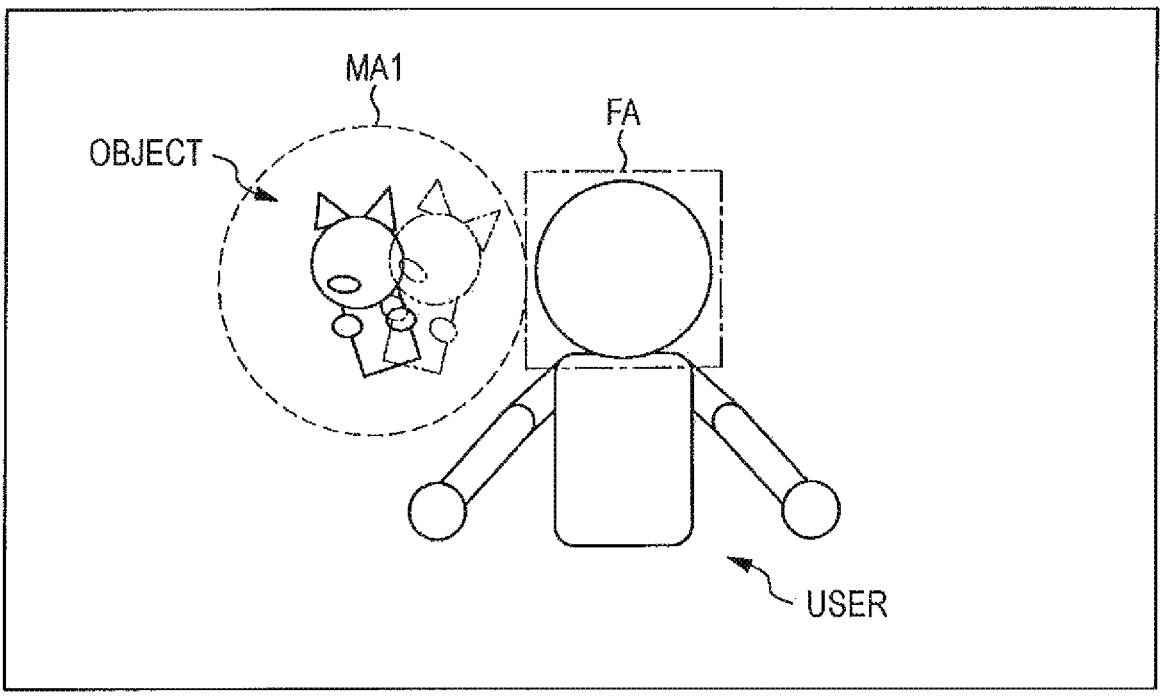
FIG. 14 is an explanatory diagram for describing advantages of detecting that a predetermined action has been performed using individual detection information, by the information processing device according to an embodiment of the present disclosure.

FIGS. 13 and 14 are explanatory diagrams for describing advantages of the information processing device 100 according to an embodiment of the present disclosure detecting that a predetermined action has been performed using individual detection information.

In the event that there are a user A and user B in an imaged image such as shown in FIG. 13, part or all of the action regions MA of each user may overlap action regions MA of the other user. In this case, in the event that one user (the user B in FIG. 13) has performed a bye-bye action in overlapping action regions MA, which user has performed this action may not be able to be detected unequivocally. Now, in the event of performing determination using the individual detection information, the information processing device 100 can unequivocally determine whether the action which has been performed is an action of the user A or an action of the user B. Accordingly, even in cases that there are the user A and user B in an imaged image such as shown in FIG. 13, the information processing device 100 can prevent erroneous detection or excessive detection of predetermined actions of users corresponding to the face information included in the individual detection information, by detecting that a predetermined action has been performed using the individual detection information.

Also, by performing determination using individual detection information, the information processing device 100 detects predetermined actions with a detection reference unique to the user, so as shown in FIG. 14, even in the event that a periodic action is performed within a set action region MA by an object which is not the user, the information processing device 100 can prevent erroneous detection or excessive detection of predetermined actions of users better than a case of using reference detection information.

Referring to FIG. 11 again, an example of processing relating to the operability improvement approaches at the information processing device 100 according to an embodiment of the present disclosure will be described. Upon the processing of step S208 being performed, the information processing device 100 determines whether or not a predetermined action has been detected in the set action regions MA (S210). In the event that a predetermined action is not detected in step S210 in a set action region MA, the information processing device 100 repeats the processing from step S202.

Also, in the event that determination is made in step S210 that a predetermined action has been detected in a set action region MA the information processing device 100 performs processing corresponding to the detected action (S212). Here, the processing of step S212 corresponds to the processing of (4) above (execution processing).

By performing the processing shown in FIG. 11 for example, the information processing device 100 can realize the processing of (1) (face region detection processing) through the processing of (4) (Execution processing) described above, relating to the first operability improvement approach. Accordingly, the information processing device 100 can improve user operability by performing the processing shown in FIG. 11, for example.

Figure 15:
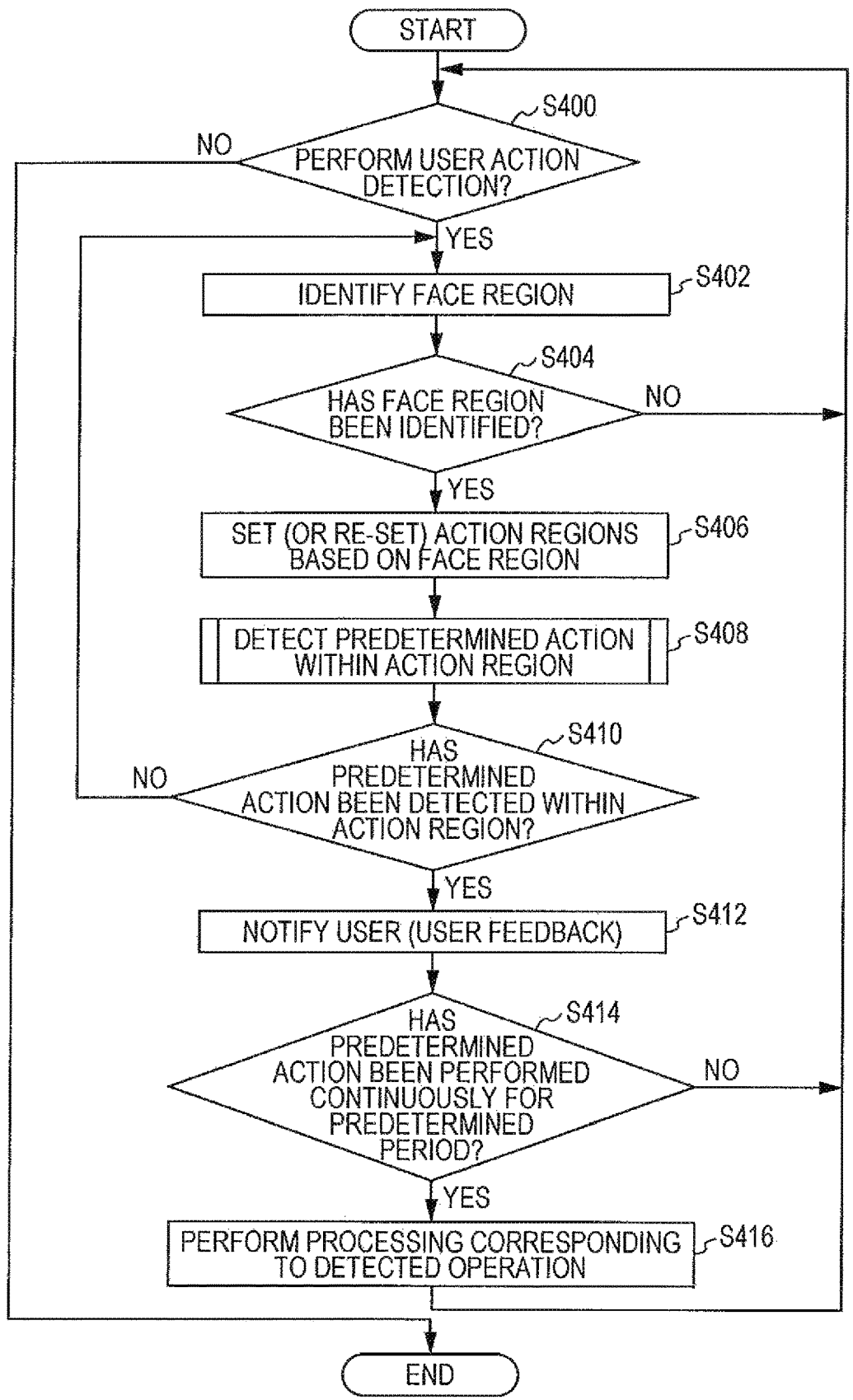
FIG. 15 is a flowchart illustrating another example of processing relating to the first operability improvement approach with the information processing device according to an embodiment of the present disclosure.

1-1-2-1. Specific Example of Second Processing Relating to First Operability Improvement Approach FIG. 15 is a flowchart illustrating another example of processing relating to the first operability improvement approach at an information processing device 100 according to an embodiment of the present disclosure, and illustrates an example of processing corresponding to the second processing relating to the first operability improvement approach described above. In the following, description will be made with reference to an example of processing in a case of the information processing device 100 determining a predetermined action made by a user, based on periodic components in an action region MA set as to the imaged image.

In the same way as with step S200 in FIG. 11, the information processing device 100 determines whether or not to perform action detection of the user (S400). In the event that determination is not made to perform action detection of the user in step S400, the information processing device 100 ends the processing relating to the operability improvement approach. Note that the processing relating to the first operability improvement approach in FIG. 15 is not processing of a type which is not performed again once it is ended, rather, the information processing device 100 can periodically/non-periodically repeat the processing relating to the first operability improvement approach shown in FIG. 15 even though the processing ends for the time being.

Also, in the event that determination is made to perform action detection of the user in step S400, in the same way as with step S202 in FIG. 11, the information processing device 100 performs face detection based on the input imaged image, and identifies a face region FA (S402). Now, the processing in step S402 corresponds to the processing of (I) above (face region detection processing). Also, in the event that multiple face regions FA are identified from the imaged image, such as in a case that there are multiple users included in the imaged image, the information processing device 100 performs the processing of the later-described steps S404 through S416 for each of the identified multiple face regions FA.

Upon performing the processing of step S402, in the same way as with step S204 in FIG. 11, the information processing device 100 determines whether or not a face region FA has been identified (S404). In the event that determination is not made that a face region FA has been identified in step S404, the information processing device 100 repeats the processing from step S400.

Also, in the event that determination is made that a face region FA has been identified in step S404, in the same way as with step S206 in FIG. 11, the information processing device 100 sets action regions MA based on the face region FA (S406). Now, the processing in step S406 corresponds to the processing of (II) above (action region setting processing).

Upon action regions MA being set (or re-set) in step S406, in the same way as with step S208 in FIG. 11, the information processing device 100 detects predetermined actions in the set action regions MA (S408). The information processing device 100 then determines whether or not a predetermined action has been detected within the set action regions MA (S410). In the event that determination is not made that a predetermined action has been detected in the set action regions MA in step S410, the information processing device 100 repeats the processing from step S402.

Also, in the event that determination is made that a predetermined action has been detected in the set action regions MA in step S410, the information processing device 100 notifies the user that a predetermined action has been detected (S412). Here, the processing of step S412 corresponds to the processing of (IV) above (notification processing).

More specifically, as shown in FIGS. 4 through 8 for example, the information processing device 100 visually notifies the user that determination has been made that a predetermined action has been performed by the user in an action region MA (or cause an external device to make notification). Note that the information processing device 100 may also audibly notify the user (or cause an external device to make notification) by outputting audio indicating that that determination has been made that a predetermined action has been performed by the user, for example, from an audio output device of its own (e.g., a later-described audio output unit) or external audio output device.

Also, in the event that determination is made that a predetermined action has been detected within a set action region MA in step S410, the information processing device 100 determines whether or not the predetermined action has been continuously performed for a predetermined period from determination that the predetermined action has been performed (S414). Now, the processing of steps S408, S410, and S414, are equivalent to the processing of (III) above (Action determination processing).

Note that while FIG. 15 shows an example where the processing of step S414 is performed after the processing of step S412, the information processing device 100 can perform the processing of step S414 and the processing of step S412 independently, with the predetermined action having been detected in a set action region MA in step S410 as a trigger.

In the event that determination is not made in step S414 that the predetermined action has been continuously performed for a predetermined period, the information processing device 100 repeats the processing from step S400. Now, an example of a case in which determination is not made that the predetermined action has been continuously performed for a predetermined period is a case where the user has stopped his/her own actions due to the notification from the processing in step S412.

Also, in the event that determination is made in step S414 that the predetermined action has been continuously performed for a predetermined period, the information processing device 100 performs processing corresponding to the detected action (S416) in the same way as with step S212 in FIG. 11. Here, the processing of step S416 corresponds to the processing of (V) above (execution processing).

By performing the processing shown in FIG. 15 for example, the information processing device 100 can realize the processing of (I) (face region detection processing) through the processing of (V) (execution processing) described above, relating to the first operability improvement approach. Accordingly, the information processing device 100 can improve user operability by performing the processing shown in FIG. 15, for example.

For example, by performing the processing shown in FIGS. 11 and 15, the information processing device 100 realizes the first operability improvement approach according to an embodiment of the present disclosure described above. It goes without saying that the processing relating to the first operability improvement approach with the information processing device 100 according to an embodiment of the present disclosure is not restricted to the processing shown in FIGS. 11 and 15.

Next, description will be made regarding a specific example of processing relating to the second operability improvement approach described above. In the following, description will be made regarding each of 1-2-1. an example of processing at the information processing device 100 in a case where determination notification information transmitted from a communication object device has not been received, and 1-2-2. an example of processing at the information processing device 100 in a case where determination notification information transmitted from a communication object device has been received.

Figure 16:
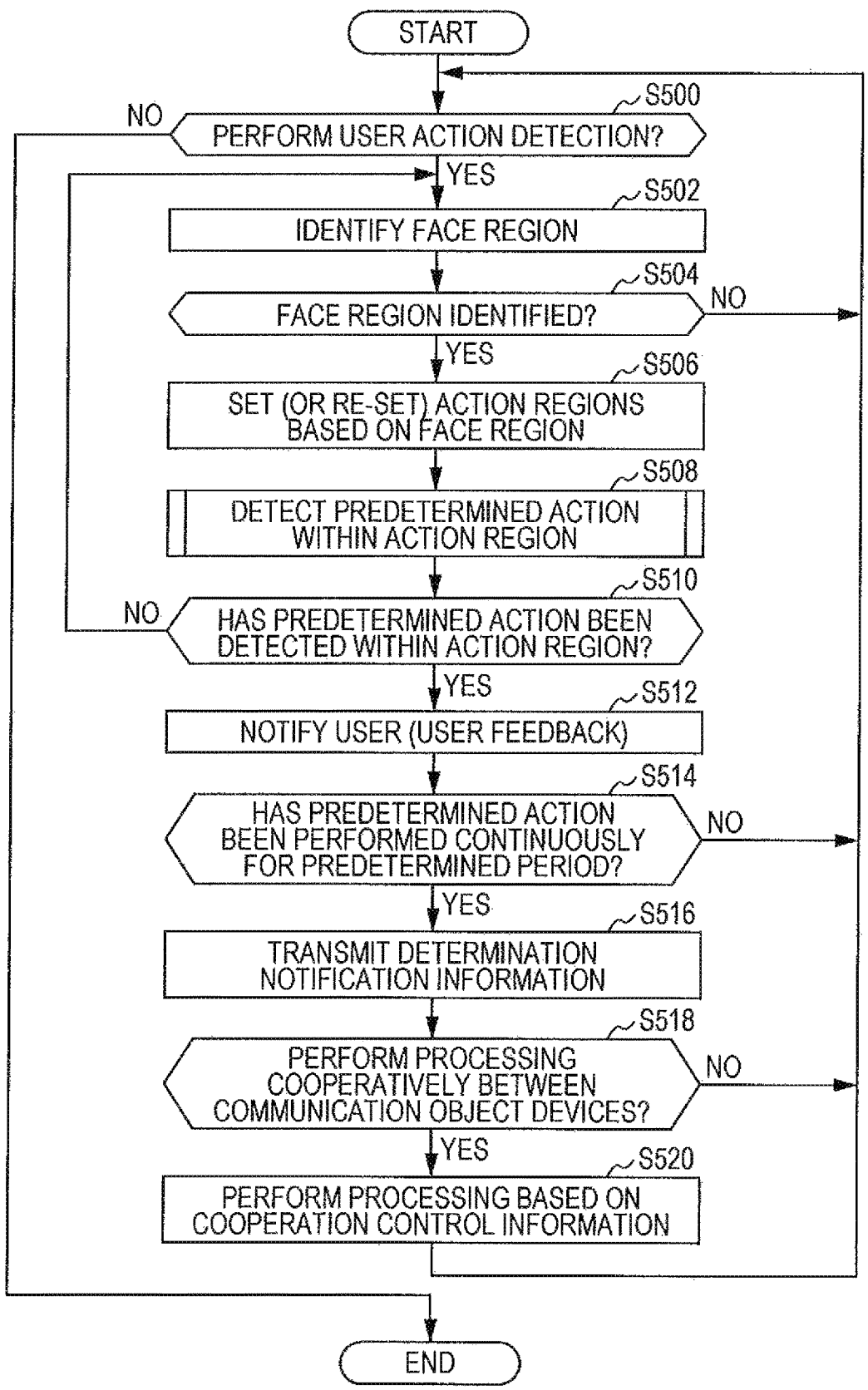
FIG. 16 is a flowchart illustrating an example of processing relating to the second operability improvement approach with the information processing device according to an embodiment of the present disclosure.

1-2-1. Specific Example of Processing in Case where Determination Notification Information Transmitted from Communication Object Device has not been Received FIG. 16 is a flowchart illustrating an example of processing relating to the second operability improvement approach at an information processing device 100 according to an embodiment of the present disclosure, and illustrates an example of processing in a case where determination notification information transmitted from a communication object device has not been received. Here, FIG. 16 illustrates an example of processing in a case of performing the processing of (IV) above (notification processing) in the same way as with the second processing relating to the first operability improvement approach shown in FIG. 15. Hereinafter, description will be made with reference to an example of processing in a case of the information processing device 100 determining a predetermined action made by a user, based on periodic components in an action region MA set as to the imaged image. Also, description will be made hereinafter with reference to an example of the cooperation control server 200 in the communication system 1000 generating cooperation control information, as shown in FIG. 9.

In the same way as with step S200 in FIG. 11, the information processing device 100 determines whether or not to perform action detection of the user (S500). In the event that determination is not made to perform action detection of the user in step S500, the information processing device 100 ends the processing relating to the operability improvement approach. Note that the processing relating to the second operability improvement approach in FIG. 16 is not processing of a type which is not performed again once it is ended, rather, the information processing device 100 can periodically/non-periodically repeat the processing relating to the second operability improvement approach shown in FIG. 16 even though the processing ends for the time being.

Also, in the event that determination is made to perform action detection of the user in step S500, in the same way as with step S202 in FIG. 11, the information processing device 100 performs face detection based on the input imaged image, and identifies a face region FA (S502). Now, the processing in step S502 corresponds to the processing of (i) above (face region detection processing). Also, in the event that multiple face regions FA are identified from the imaged image, such as in a case that there are multiple users included in the imaged image, the information processing device 100 performs the processing of the later-described steps S504 through S520 for each of the identified multiple face regions FA, for example. Note that the processing in the case of multiple face regions FA having been detected from the imaged image is not restricted to the above-described. For example, the information processing device 100 according to an embodiment of the present disclosure may perform face verification as to the face regions FA, and execute the processing of the later-described steps S504 through S520 on a face region FA corresponding to a particular user.

Upon performing the processing of step S502, in the same way as with step S204 in FIG. 11, the information processing device 100 determines whether or not a face region FA has been identified (S504). In the event that determination is not made that a face region FA has been identified in step S504, the information processing device 100 repeats the processing from step S500.

Also, in the event that determination is made that a face region FA has been identified in step S504, in the same way as with step S206 in FIG. 11, the information processing device 100 sets action regions MA based on the face region FA (S506). Now, the processing in step S506 corresponds to the processing of (ii) above (action region setting processing).

Upon action regions MA being set (or re-set) in step S506, in the same way as with step S208 in FIG. 11, the information processing device 100 detects predetermined actions in the set action regions MA (S508). The information processing device 100 then determines whether or not a predetermined action has been detected within the set action regions MA (S510). In the event that determination is not made that a predetermined action has been detected in the set action regions MA in step S510, the information processing device 100 repeats the processing from step S502.

Also, in the event that determination is made that a predetermined action has been detected in the set action regions MA in step S510, the information processing device 100 notifies the user that a predetermined action has been detected (S512), in the same way as with step S412 in FIG. 15. Here, the processing of step S512 corresponds to notification processing the same as with the processing of (IV) above (notification processing).

Also, in the event that determination is made that a predetermined action has been detected within a set action region MA in step S510, the information processing device 100 determines whether or not the predetermined action has been continuously performed for a predetermined period from determination that the predetermined action has been performed (S514), in the same way as with step S414 in FIG. 15. Now, the processing of steps S508, S510, and S514, are equivalent to the processing of (iii) above (action determination processing).

In the event that determination is not made in step S514 that the predetermined action has been continuously performed for a predetermined period, the information processing device 100 repeats the processing from step S500. Now, an example of a case in which determination is not made that the predetermined action has been continuously performed for a predetermined period is a case where the user has stopped his/her own actions due to the notification from the processing in step S512.

Also, in the event that determination is made in step S514 that the predetermined action has been continuously performed for a predetermined period, the information processing device 100 transmits determination notification information to the cooperation control server 200 (S516).

Upon transmitting the determination notification information in step S516, the information processing device 100 determines whether or not to perform processing cooperatively with a communication object device (S518). The information processing device 100 performs the processing of step S518 based on cooperation control information transmitted from the cooperation control server 200, for example. Here, the processing of steps S516 and S518 corresponds to the processing of (iv) above (cooperation determination processing).

In the event that determination is not made in step S518 to perform processing cooperatively with a communication object device, the information processing device 100 repeats the processing from step S500.

Also, in the event that determination is made in step S518 to perform processing cooperatively with a communication object device, the information processing device 100 selectively performs processing based on the cooperation control information (S520). Here, the processing of step S520 corresponds to the processing of (v) above (execution processing).

By performing the processing shown in FIG. 16 for example, the information processing device 100 can realize the processing of (i) (face region detection processing) through the processing of (v) (execution processing) described above, relating to the second operability improvement approach. Accordingly, the information processing device 100 can improve user convenience and operability with the communication system 1000 by performing the processing shown in FIG. 16, for example.

Figure 17:
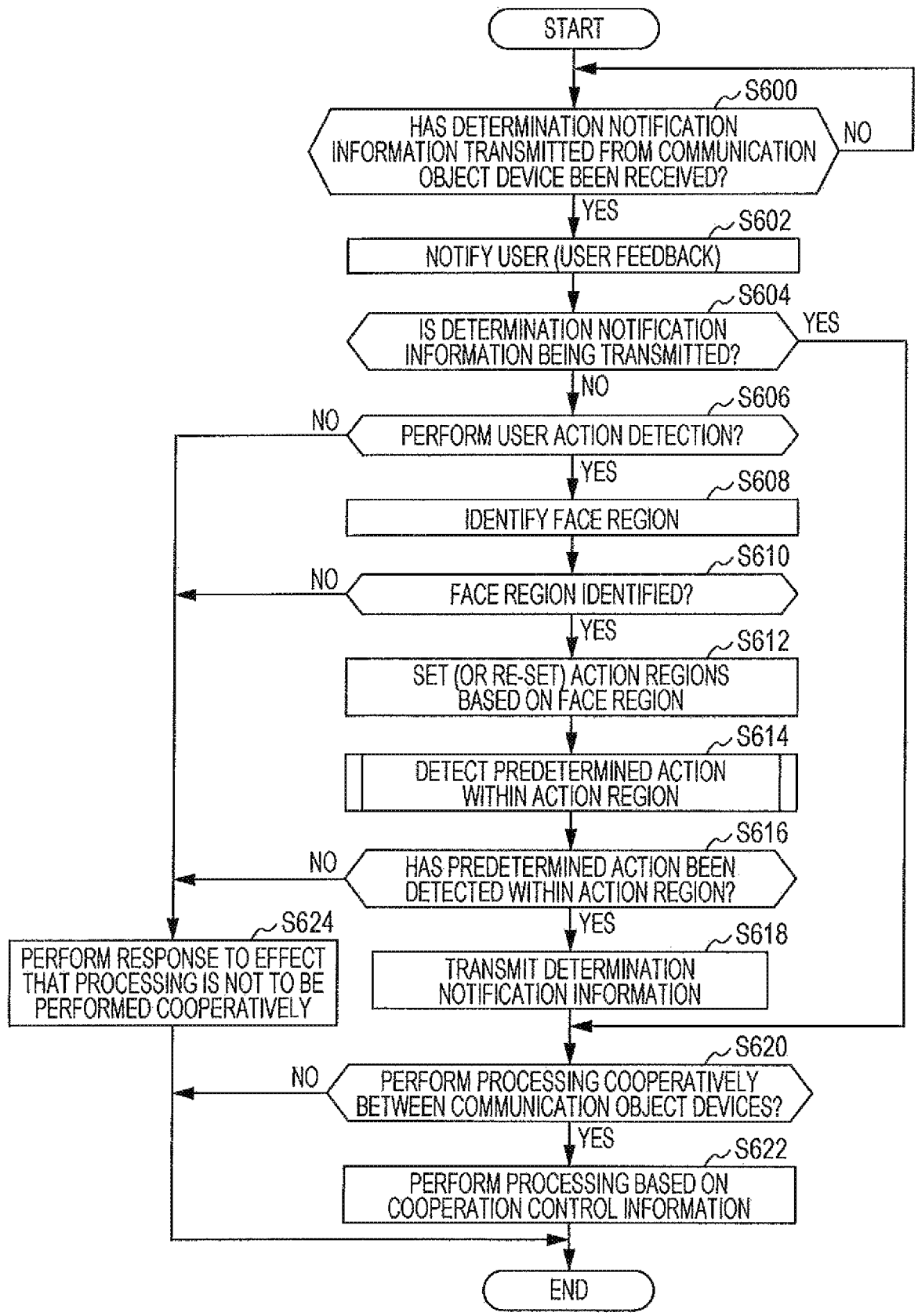
FIG. 17 is a flowchart illustrating an example of processing relating to the second operability improvement approach with the information processing device according to an embodiment of the present disclosure.

1-2-2. Specific Example of Processing in Case where Determination Notification Information Transmitted from Communication Object Device has been Received FIG. 17 is a flowchart illustrating an example of processing relating to the second operability improvement approach at an information processing device 100 according to an embodiment of the present disclosure, and illustrates an example of processing in a case where determination notification information transmitted from a communication object device has been received. Hereinafter, description will be made with reference to an example of processing in a case of the cooperation control server 200 in the communication system 1000 generating cooperation control information, as shown in FIG. 9, in the same way as with FIG. 16.

The information processing device 100 determines whether or not determination notification information transmitted from the communication object device has been received (S600). In the event that determination is not made in step S600 that determination notification information transmitted from the communication object device has been received, the information processing device 100 does not advance the processing until determination is made that determination notification information transmitted from the communication object device has been received.

Also, in the event that determination is made in step S600 that determination notification information transmitted from the communication object device has been received, the information processing device 100 notifies the user that determination notification information transmitted from the communication object device has been received (S602).

Now, as shown in H in FIG. 10 for example, the information processing device 100 visually notifies the user by changing the image, but the notification method to the user in step S602 is not restricted to the above-described. For example, the information processing device 100 can visually notify the user that determination notification information transmitted from the communication object device has been received, by changing the lit state of the lighting device, as shown in FIG. 8. Also, the information processing device 100 may audibly notify the user that determination notification information transmitted from the communication object device has been received.

Also, in the event that determination is made in step S600 that determination notification information transmitted from the communication object device has been received, the information processing device 100 determines whether or not determination notification information has been transmitted (S604). Now, in the event that processing of step S516 shown in FIG. 16 has already been performed, the information processing device 100 determines that determination notification information has been transmitted. That is to say, the processing of step S604 is equivalent to determining whether the received determination notification information is that which has been transmitted as the result of the processing of step S516 shown in FIG. 16 having been performed at the communication object device, or is that which has been transmitted from the communication object device as a response to the determination notification information transmitted from this device itself.

Note that while FIG. 17 illustrates an example where the processing of step S604 is performed after the processing of step S602, the information processing device 100 can perform the processing of step S602 and the processing of step S604 independently, with determination being made in step S600 that the determination notification information transmitted from the communication object device has been received, as a trigger.

In the event that determination is made in step S604 that the determination notification information has been transmitted, the information processing device 100 performs the processing of the later-described step S620. The processing of step S620 in the above case corresponds to the processing of step S518 shown in FIG. 16.

Also, in the event that determination is not made in step S604 that the determination notification information has been transmitted, the information processing device 100 determines whether or not to perform action detection of the user (S606), in the same way as with step S200 in FIG. 11. In the event that determination is not made to perform action detection of the user in step S606, the information processing device 100 makes a response to the cooperation control server 200 to the effect that processing will not be performed cooperatively (S624), and ends the processing. Note that the processing relating to the second operability improvement approach in FIG. 17 is not processing of a type which is not performed again once it is ended, rather, the information processing device 100 can repeat the processing relating to the second operability improvement approach shown in FIG. 17.

Also, in the event that determination is made to perform action detection of the user in step S606, in the same way as with step S202 in FIG. 11, the information processing device 100 performs face detection based on the input imaged image, and identifies a face region FA (S608). Now, the processing in step S608 corresponds to the processing of (i) above (face region detection processing) in the same way as with step S502 in FIG. 16.

Upon performing the processing of step S608, in the same way as with step S204 in FIG. 11, the information processing device 100 determines whether or not a face region FA has been identified (S610). In the event that determination is not made that a face region FA has been identified in step S610, the information processing device 100 makes a response to the cooperation control server 200 to the effect that processing will not be performed cooperatively (S624), and ends the processing.

Note that while FIG. 17 illustrates an example of performing the determination of step S610 once, but the processing of the information processing device 100 in a case of having received determination notification information transmitted from the communication object device is not restricted to the above-described. For example, the information processing device 100 does not have to determine that a face region FA has been identified in the event that the determination of step S610 is repeated for a predetermined number of times but no face region FA is determined.

Also, in the event that determination is made that a face region FA has been identified in step S610, in the same way as with step S206 in FIG. 11, the information processing device 100 sets action regions MA based on the face region FA (S612). Now, the processing in step S612 corresponds to the processing of (ii) above (action region setting processing), in the same was as with step S506 in FIG. 16.

Upon action regions MA being set (or re-set) in step S612, in the same way as with step S208 in FIG. 11, the information processing device 100 detects predetermined actions in the set action regions MA (S614). The information processing device 100 then determines whether or not a predetermined action has been detected within the set action regions MA (S616).

In the event that determination is not made that a predetermined action has been detected in the set action regions MA in step S616, the information processing device 100 makes a response to the cooperation control server 200 to the effect that processing will not be performed cooperatively (S624), and ends the processing.

Note that while FIG. 17 illustrates an example of performing the determination of step S616 once, but the processing of the information processing device 100 in a case of having received determination notification information transmitted from the communication object device is not restricted to the above-described. For example, the information processing device 100 does not have to determine that a predetermined action has been detected in the event that the determination of step S616 is repeated for a predetermined number of times but no predetermined action is detected.

In the event that determination is made that a predetermined action has been detected in the set action regions MA in step S616, the information processing device 100 transmits determination notification information to the cooperation control server 200 (S618). Here, the determination notification information transmitted in step S618 corresponds to the response as to the determination notification information received in step S600.

Note that while FIG. 17 illustrates an example of performing the processing of step S618 in the event that determination is made in step S616 that a predetermined action has been detected in a set action region MA, the processing of the information processing device 100 in a case of receiving determination notification information transmitted from a communication object device is not restricted to the above-described. For example, in the event that determination is made that a predetermined action has been detected within a set action region MA in step S616, the information processing device 100 may determine whether or not the predetermined action has been continuously performed for a predetermined period from determination that the predetermined action has been performed, in the same way as with step S514 in FIG. 16. In the above-described case, in the event that determination is made that the predetermined action has been continuously performed for a predetermined period from determination that the predetermined action has been performed, for example, the information processing device 100 performs the processing of step S618. Also, in the above-described case, in the event that determination is not made that the predetermined action has been continuously performed for a predetermined period from determination that the predetermined action has been performed, for example, the information processing device 100 makes a response to the cooperation control server 200 to the effect that processing will not be performed cooperatively (S624), and ends the processing.

Upon transmitting the determination notification information in step S618, the information processing device 100 determines whether or not to perform processing cooperatively with a communication object device (S620) in the same way as with step S518 in FIG. 16. Here, the processing of steps S618 and S620 corresponds to the processing of (iv) above (cooperation determination processing).

In the event that determination is not made in step S620 to perform processing cooperatively with a communication object device, the information processing device 100 ends the processing.

Also, in the event that determination is made in step S620 to perform processing cooperatively with a communication object device, the information processing device 100 selectively performs processing based on the cooperation control information (S622), in the same way as with step S520 in FIG. 16. Here, the processing of step S622 corresponds to the processing of (v) above (execution processing).

By performing the processing shown in FIG. 17 for example, the information processing device 100 can realize the processing of (i) (face region detection processing) through the processing of (v) (execution processing) described above, relating to the second operability improvement approach. Accordingly, the information processing device 100 can improve user convenience and operability in the communication system 1000 by performing the processing shown in FIG. 17, for example.

By performing the processing shown in FIGS. 16 and 17 for example, the information processing device 100 realizes the second operability improvement approach according to an embodiment of the present disclosure described above. Note that the processing relating to the second operability improvement approach at the information processing device 100 according to an embodiment of the present disclosure is not restricted to the processing shown in FIGS. 16 and 17. For example, in the event that determination is made that a predetermined action has been detected in a set action region MA in the processing in step S510 shown in FIG. 16, the information processing device 100 may further determine whether the determined predetermined action is an action for performing processing cooperatively with a communication object device. In the above-described case, in the event that determination is made that the determined predetermined action is an action for performing processing cooperatively with a communication object device, the information processing device 100 performs the processing of step S512 and on. Also, in the event that determination is not made that the determined predetermined action is an action for performing processing cooperatively with a communication object device, the information processing device 100 performs the processing of step S112 in FIG. 11 or the processing of step S312 in FIG. 15 and on, relating to the first operability improvement approach, for example.

As described above for example, by further determining whether a predetermined action which has been determined is an action for performing processing cooperatively with a communication object device, the information processing device 100 can selectively switch between and execute processing relating to the first operability improvement approach and processing relating to the second operability improvement approach described above. Accordingly, the information processing device 100 can distinguish between processing to be performed individually by itself and processing to be performed cooperatively with a communication object device, in accordance with predetermined actions performed by users, so user convenience and operability can further be improved.

2. Information Processing Device According to Embodiments of Present Disclosure Next, an example will be described of the configuration of an information processing device 100 according to an embodiment of the present disclosure, that is capable of performing processing relating to the operability improvement approaches according to an embodiment of the present disclosure described above.

The configuration of the information processing device 100 according to an embodiment of the present disclosure will be described below with reference to an example of an information processing device 100 capable of executing processing relating to the second operability improvement approach described above. Note that the information processing device 100 according to an embodiment of the present disclosure can realize the processing according to the first operability improvement approach described above by having a configuration without a later-described cooperation determination unit, for example, and a later-described processing unit selectively performing processing based on the determination results at a later-described action determination unit. Also, the information processing device 100 according to an embodiment of the present disclosure may have a configuration including a cooperation determination unit but with the cooperation determination unit not functioning, for example. With the above configuration as well, the information processing device 100 according to an embodiment of the present disclosure can realize the processing according to the first operability improvement approach described above.

Also, in the following, description will be made with reference to an example of a configuration where the information processing device 100 has a later-described notification processing unit, and thereby performs notification processing the same as with the processing of (IV) above (notification processing). Note that the information processing device 100 according to an embodiment of the present disclosure may have a configuration not including the notification processing unit, or a configuration including the notification processing unit but the notification processing unit is not functioning. Also, the information processing device 100 according to an embodiment of the present disclosure can also have a configuration where notification processing is performed selectively, by having a configuration where the later-described notification processing unit is made to selectively function.

First Embodiment

Figure 18:
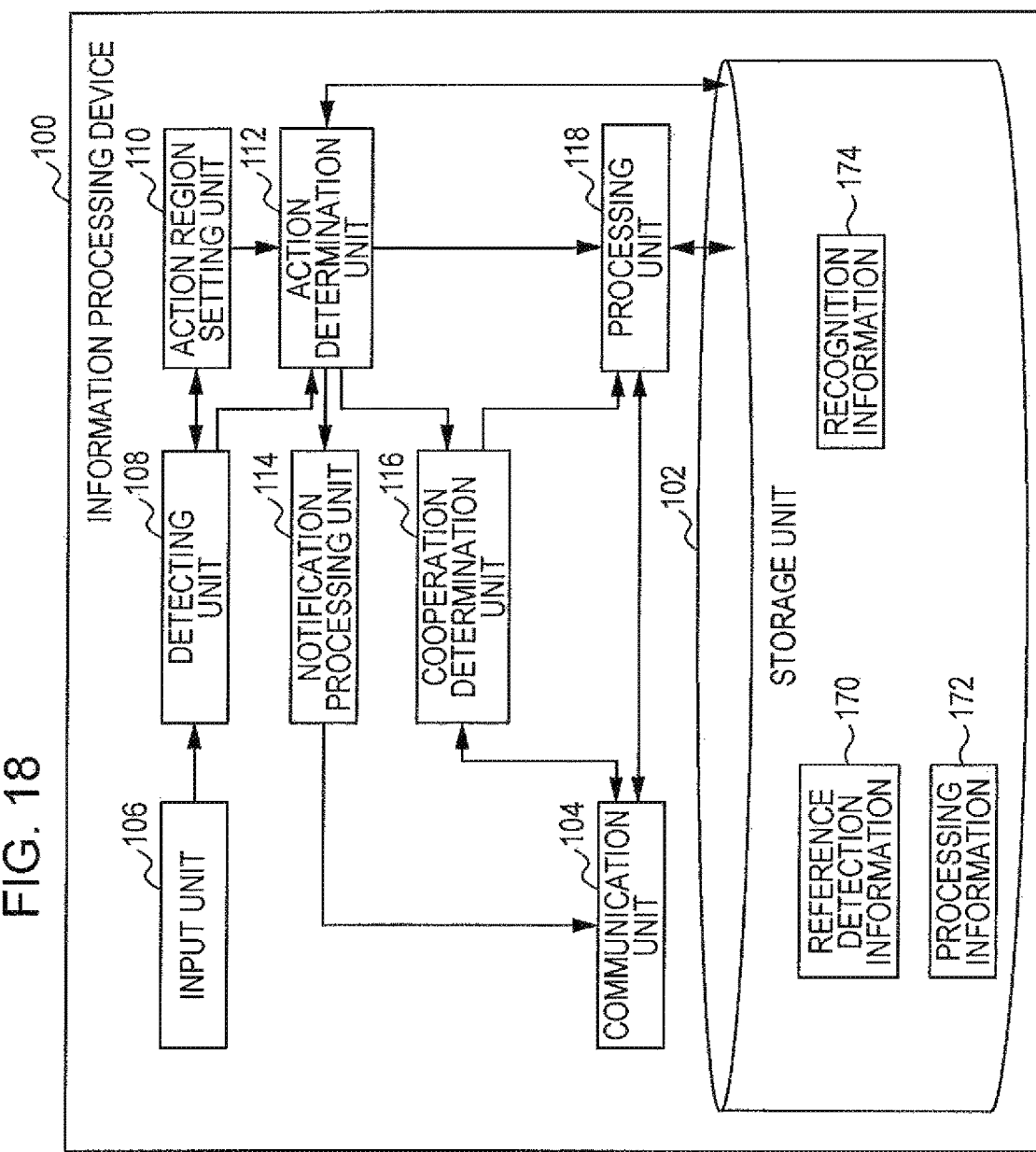
FIG. 18 is a block diagram illustrating an example of the configuration of an information processing device according to a first embodiment of the present disclosure.

FIG. 18 is a block diagram illustrating an example of the configuration of an information processing device 100 according to a first embodiment of the present disclosure. In FIG. 18, an example is shown where a communication system 1000 has a cooperation control server 200 which generates cooperation control information as shown in FIG. 9 for example, and the cooperation control server 200 and a communication object device 300 (other information processing device 100) are connected with the information processing device 100 by a network 400. Note that the above phrase "connected by a network 400" means that one device and another device are performing communication over the network 400, or are in a communicable state. Examples of the network 400 include cable networks such as a LAN (Local Area Network) or WAN (Wide Area Network), wireless networks such as a wireless WAN using a base station (WWAN (Wireless Wide Area Network)), the Internet using communication protocols such as TCP/IP (Transmission Control Protocol/Internet Protocol), and so forth. Note that the information processing device 100, cooperation control server 200, and communication object device 300 are not restricted to performing communication over the network 400, and may perform communication directly.

Also, FIG. 18 shows as well a display system 500 which performs display of an image (still image or moving image) on a display screen, and generating of imaged images by imaging in the display direction of the display screen. Also, while FIG. 18 shows an example where the display system 500 is made up of a display device 600 which performs display and an imaging apparatus 700 which performs imaging, the configuration of the display system 500 according to an embodiment of the present disclosure is not restricted to the above-described. For example, the display system 500 may be a device wherein the display device 600 and the imaging apparatus 700 have been integrated (e.g., a display device having imaging functions).

Now, an imaged image which has imaged the user viewing the display screen is obtained by the display system 500 generating an imaged image taking images in the direction of display of the display screen. Accordingly, by the information processing device 100 processing the imaged image generated by the display system 500, the information processing device 100 can easily perform processing such as identifying face regions FA and setting action regions MA, detection of predetermined actions of the user, extraction of facial expressions, and so forth.

With reference to FIG. 18, the information processing device 100 has a storage unit 102, a communication unit 104, an input unit 106, a detecting unit 108, an action region setting unit 110, an action determination unit 112, a notification processing unit 114, a cooperation determination unit 116, and a processing unit 118.

The information processing device 100 may further have a control unit (not shown), ROM (Read Only Memory (not shown)), RAM (Random Access Memory (not shown)), and so forth, for example. The information processing device 100 has the components interconnected by a bus serving as a data transfer path, for example. Here, the control unit (not shown) serves to control the entire information processing device 100. Note that with the information processing device 100, the processing unit 118 may serve as the control unit (not shown), for example. Also, ROM (not shown) stores programs which the control unit (not shown) uses, and data for processing such as computation parameters and so forth, for example. The RAM (not shown) temporarily stores data and programs executed by the control unit (not shown) for example.

Hardware Configuration Example of Information Processing Device 100

Figure 19:
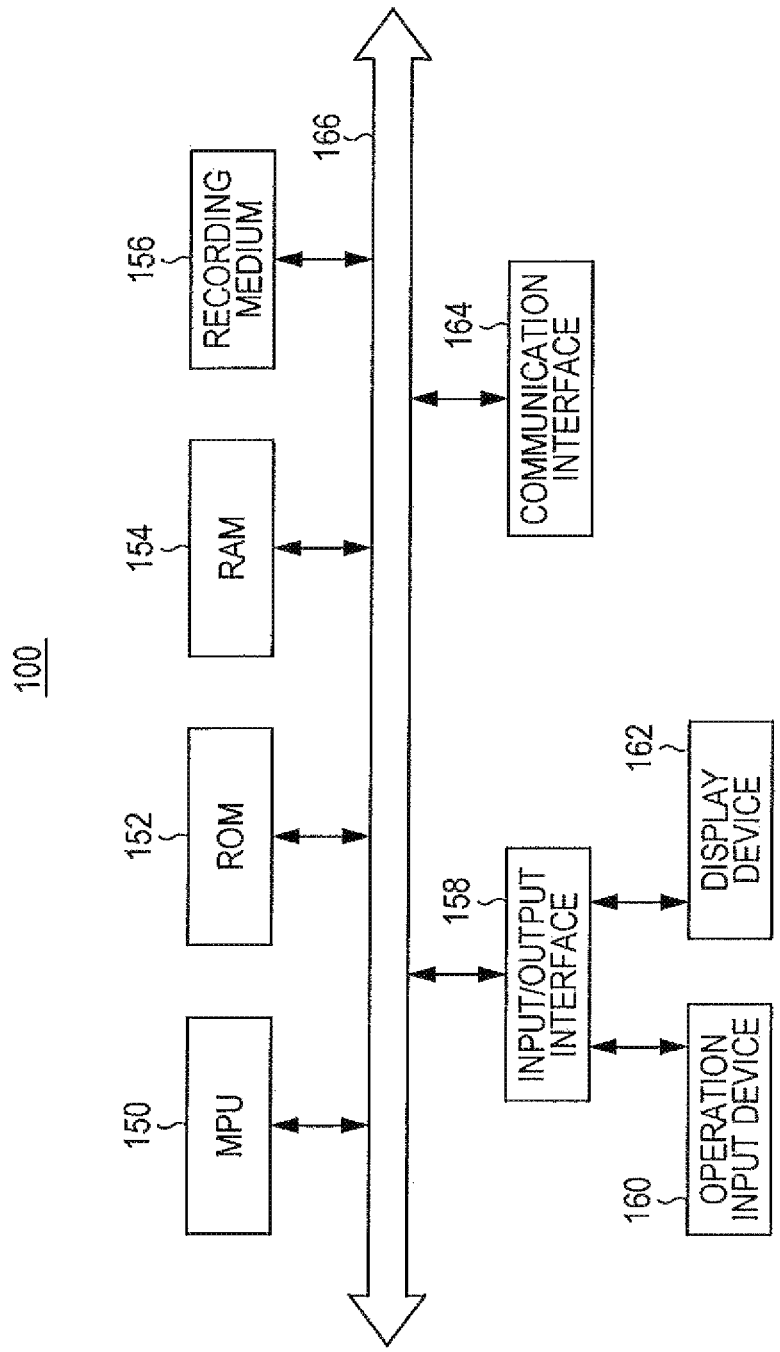
FIG. 19 is an explanatory diagram illustrating an example of the hardware configuration of an information processing device according to an embodiment of the present disclosure.

FIG. 19 is an explanatory diagram illustrating an example of the hardware configuration of an information processing device 100 according to an embodiment of the present disclosure. With reference to FIG. 19, the information processing device 100 includes, for example, an MPU (Micro Processing Unit) 150, ROM 152, RAM 154, a recording medium 156, an input/output interface 158, an operation input device 160, a display device 162, and a communication interface 164. Also, the information processing device 100 has the components interconnected with a bus 166 serving as a data transfer path, for example.

The MPU 150 is an integrated circuit where multiple circuits for realizing various types of functions such as image processing and the like are integrated, and so forth, and functions as a control unit (not shown) controlling the entire information processing device 100. Also, the MPU 150 serves as the detecting unit 108, action region setting unit 110, an action determination unit 112, notification processing unit 114, cooperation determination unit 116, and processing unit 118 in the information processing device 100. Also, the MPU 150 may serve as a later-described learning unit.

The ROM 152 control data such as stores programs and computation parameters and the like which the MPU 150 uses. The RAM 154 temporarily stores the programs and the like to be executed by the MPU 150, for example.

The recording medium 156 functions as the storage unit 102, and stores various data such as reference detection information, individual detection information, processing information, and so forth (or databases), applications, and so forth, for example. Examples of the recording medium 156 include magnetic storage media such as hard disks or the like, and nonvolatile memory such as EEPROM (Electrically Erasable and Programmable Read Only Memory), flash memory, MRAM (Magnetoresistive Random Access Memory), FeRAM (Ferroelectric Random Access Memory), and PRAM (Phase change Random Access Memory). Also, the information processing device 100 may have a recording medium 156 which is detachable from the information processing device 100.

Also, the input/output interface 158 connects the operation input device 160 and display device 162, for example. Also, the input/output interface 158 can serve as the input unit 106. The operation input device 160 serves as an operating unit (not shown), and the display device 162 serves as a display unit (later-described). Now, examples of the input/output interface 158 include a USB (Universal Serial Bus) terminal, DVI (Digital Visual Interface) terminal, HDMI (High-Definition Multimedia Interface) terminal, various types of processing circuits, and so forth. Also, the operation input device 160 is provided on the information processing device 100 for example, and is connected with the input/output interface 158 inside the information processing device 100. Examples of the operation input device 160 include buttons, direction keys, rotating selectors such as jog dials, combinations thereof, and so forth. Also, the display device 162 is provided on the information processing device 100 for example, and is connected with the input/output interface 158 inside the information processing device 100. Examples of the display device 162 include LCDs (Liquid Crystal Display) and organic ElectroLuminescence displays (also called OLED (Organic Light Emitting Diode) displays). It goes without saying that the input/output interface 158 can be connected external devices serving as external devices of the information processing device 100, such as an operation input device (e.g., keyboard, mouse), display device (e.g., external display device such as display device 600), imaging device (e.g., imaging apparatus 700 and so forth) and the like. Also, the display device 162 may be a device capable of display and user operations, such as a touch screen for example.

The communication interface 164 of the information processing device 100 functions as the communication unit 104 for performing communication by wireless/cable with external devices such as the cooperation control server 200, communication object device 300, display device 600, server (not shown), and so forth for example, via the network 400 (or directly). Examples of the communication interface 164 include a communication antenna and RF circuit (wireless communication), IEEE 802.15.1 port and transmission/reception circuit (wireless communication), IEEE 802.11b port and transmission/reception circuit (wireless communication), or LAN terminal and transmission/reception circuit (cable communication), and so forth.

The information processing device 100 performs processing relating to the operability improvement approaches according to an embodiment of the present disclosure, with the configuration shown in FIG. 19, for example. Note that the hardware configuration of the information processing device 100 according to an embodiment of the present disclosure is not restricted to the configuration shown in FIG. 19.

For example, the information processing device 100 may have an audio output device configured of a DSP (Digital Signal Processor) and an amplifier (amp) and speakers and the like, serving as an audio output unit (later described). In the case of the above-described, the information processing device 100 can perform muting of audio and volume adjustment for example, as processing corresponding to predetermined actions of the user.

Also, the information processing device 100 may have an imaging device configured of a lens/imaging device and signal processing circuit, serving as an imaging unit (later described), for example. In the case of the above-described, the information processing device 100 can process imaged images which it has generated itself. Now, the lens/imaging device is configured of an optical lens, and an image sensor using multiple imaging devices such as CCD (Charge Coupled Device) or CMOS (Complementary Metal Oxide Semiconductor) or the like, for example. The signal processing unit has, for example, an AGC (Automatic Gain Control) circuit or ADC (Analog to Digital Converter), converts analog signals generated by the imaging device into digital signals (image data), and performs various types of signal processing. Examples of signal processing which the signal processing circuit performs include white balance correction processing, interpolation processing, color correction processing, gamma correction processing, YCbCr conversion processing, edge enhancement processing, coding processing, and so forth.

Also, the information processing device 100 may be of a configuration not having the operation input device 160 or display device 162 shown in FIG. 19, for example.

Returning to FIG. 18, the configuration of the information processing device 100 according to an embodiment of the present disclosure will be described. The storage unit 102 is storage which the information processing device 100 has. Now, examples of the storage unit 102 include magnetic recording media such as hard disks or the like, and non-volatile memory such as flash memory or the like.

Also, the storage unit 102 stores various data such as reference detection information, individual detection information, processing information, and so forth (or databases), applications, and so forth, for example. FIG. 18 illustrates an example where reference detection information 170, processing information 172, and recognition information 174 are stored in the storage unit 102. Now, the recognition information according to an embodiment of the present disclosure is information relating to a user, detected from an imaged image. Examples of the recognition information include the number of users included in the imaged image, expressions representing the feature of the user, information indicating the emotion of a user that has been estimated, presence or absence of body motions, and so forth, which is data obtained by the information processing device 100 analyzing the imaged image.

The communication unit 104 which the information processing device 100 has performs communication by wireless/cable with external devices such as the cooperation control server 200, communication object device 300, display device 600, server (not shown), and so forth for example, via the network 400 (or directly). Also, the communication unit 104 has communication thereof controlled by a control unit (not shown) and the processing unit 118, for example. Examples of the communication unit 104 here include a communication antenna and RF circuit, LAN terminal and transmission/reception circuit, and so forth, but the communication unit 104 is not restricted to the above-described. For example, the communication unit 104 may have an optional configuration so as to be communicable with an external device via the network 400.

The input unit 106 receives the imaged image which the imaging apparatus 700 has generated by imaging. The input unit 106 then hands the received (input) imaged image to the detecting unit 108. Now, examples of the input unit 106 include a USB terminal, DVI terminal, HDMI terminal, various processing circuits, and so froth, but the input unit 106 is not restricted to the above-described. For example, may have an optional configuration so as to be capable of receiving imaged images from an eternal device by cable or wirelessly.

Note that the input unit 106 is not restricted to receiving imaged images, and may receive data generated by a distance sensor or the like provided to the display device 600 (e.g., distance data indicating the distance between the display screen and the user), for example. In the event that the above data is received, the input unit 106 hands the data to the processing unit 118. In the above-described case, the information processing device 100 can perform processing corresponding to predetermined actions further based on distance data and the like handed at the later-described processing unit 118.

The detecting unit 108 has a leading role in the processing of (i) above (face region detection processing). More specifically, the detecting unit 108 detects the face region FA including the face of the user from an imaged image for example, and hands the information indicating the detected (identified) face region FA and the imaged image to the action region setting unit 110.

Also, the detecting unit 108 may further detect a moving body in the set action regions MA with the action region setting unit 110, and inform the action region determination unit 112 whether or not a moving body has been detected. In the above case, the action determination unit 112 can selectively perform later-described processing in the event that a moving body has been detected. Accordingly, with the information processing device 100, reduction of the calculation load at the information processing device 100, and prevention of non-detection or erroneous detection predetermined actions of users, can be realized.

The action region setting unit 110 has a leading role in the processing of (ii) above (action region setting processing). More specifically, in the event that a face region FA is detected at the detecting unit 108 for example, the action region setting unit 110 sets action regions MA nearby the face region FA, based on the face region FA. The action region setting unit 110 then hands the information of the set action regions MA to the detecting unit 108 and the action determination unit 112, for example. Also, the action region setting unit 110 hands the imaged image handed from the detecting unit 108, to the action determination unit 112. Note that in the event that the configuration is such that the input unit 106 and detecting unit 108 hand the imaged image to the action determination unit 112, the action region setting unit 110 does not have to hand the imaged image to the action determination unit 112.

Also, the action region setting unit 110 can extract face information indicating the features of the face of the user from the face region FA, and re-set the action regions MA set based on the face region FA based on face information (i.e., adjust the action regions MA).

The action determination unit 112 has a leading role in the processing of (iii) above (action determination processing). More specifically, the action determination unit 112 determines that a predetermined action has been performed by the user in an action region MA which the action region setting unit 110 has set, based on the imaged image and reference detection information 170. Now, the action region setting unit 110 detects periodic components in the action regions MA and determines that a predetermined action has been performed based on the detection results of the periodic component in the action region MA and the periodic component information in the reference detection information 170, for example, but the processing at the action region setting unit 110 is not restricted to the above-described.

In the event of determining that a predetermined action has been detected within an action region MA, the action determination unit 112 then hands the determination results to the notification processing unit 114. Now, in the event of having determined that a predetermined action has been detected within an action region MA for example, the action determination unit 112 selectively hands determination results indicating that the predetermined action has been detected to the notification processing unit 114, but processing at the action determination unit 112 is not restricted to the above-described. For example, the action determination unit 112 may hand determination results to the notification processing unit 114 each time processing is performed relating to determination, regardless of the results of the determination. In the case of the above, the notification processing unit 114 will selectively perform later-described processing when the handed determination results indicate that a predetermined action has been detected within an action region MA.

Also, in the event of determining that a predetermined action has been detected within an action region MA, the action determination unit 112 hands the determination results to the cooperation determination unit 116 in the same way as with handing the determination results to the notification processing unit 114. Note that processing at the action determination unit 112 for handing the determination results to the cooperation determination unit 116 is not restricted to the above-described. For example, in the event that determination is made that a predetermined action has been detected within an action region MA set by the action region setting unit 110, the action determination unit 112 may further determine whether the predetermined action has been performed continuously over a predetermined period from the determination that the predetermined action has been performed. In the above case, the action determination unit 112 hands determination results to the cooperation determination unit 116 indicating that a predetermined action has been performed continuously for a predetermined period, in the event that determination is made that a predetermined action has been performed continuously for a predetermined period, for example.

As described above, by the action determination unit 112 handing determination results indicating that a predetermined action has been performed continuously for a predetermined period to the cooperation determination unit 116, the cooperation determination unit 116 selectively performs later-described processing to be performed by the cooperation determination unit 116 in a case that the user has continuously performed a predetermined action for a predetermined period. That is to say, in the event that the user has quit his/her own action due to the notification from the notification processing which the notification processing unit 114 performs for example, the cooperation determination unit 116 does not perform processing. Accordingly, even in a case where the user performs a predetermined action which is recognized by the information processing device 100, and then the user desires canceling execution of processing corresponding to the predetermined action at the information processing device 100, or a case in which the action which the user has performed is erroneously detected by the information processing device 100, the user can control execution of the processing corresponding to the action at the information processing device 100 by his/her own actions.

Though not shown in FIG. 18, in the event that individual detection information is stored in the storage unit 102, or in the event that processing is performed collaboratively with an external device such as a server storing individual detection information, the action determination unit 112 can selectively use the reference detection information 170 or individual detection information to determine that a predetermined action has been performed by the user in an action region MA.

Also, in the event of detecting periodic component in an action region MA and determining that a predetermined action has been performed, the action determination unit 112 does not have to detect periodic component other than in the action region MA. Due to the above-described, the information processing device 100 can further reduce the load (calculation load) of processing relating to the operability improvement approaches according to an embodiment of the present disclosure.

Further, in the event of determining that a predetermined action has been detected in an action region MA, the action determination unit 112 may further determine whether or not the determined predetermined action is an action for performing processing cooperatively with the communication object device 300, based on the reference detection information 170 or individual detection information, for example. Also, in the event of determining whether or not the predetermined action is performed continuously over a predetermined period for example, the action determination unit 112 performs the above determination relating to cooperation in the event that determination is made that the predetermined action has been performed continuously over a predetermined period.

Now, in the event of determining that the predetermined action is an action for performing processing cooperatively with the communication object device 300 due to the above determination, the action determination unit 112 hands the determination results to the cooperation determination unit 116. In the above case, the information processing device 100 will perform processing relating to the second operability improvement approach described above.

Also, in the event of not determining that the predetermined action is an action for performing processing cooperatively with the communication object device 300 due to the above determination, the action determination unit 112 hands the determination results that the predetermined action has been performed to the processing unit 118. In the above case, the cooperation determination unit 116 dies not perform the later-described processing which the cooperation determination unit 116 performs, and also the processing unit 118 performs processing corresponding to the predetermined action determined at the action determination unit 112 in the same way as with the processing of (4) above (execution processing) or the processing of (V) above (execution processing) according to the first operability improvement approach. That is to say, in the above case, the information processing device 100 performs processing relating to the first operability improvement approach described above.

By the action determination unit 112 further performing determination that the determined predetermined action is an action for performing processing cooperatively with the communication object device 300 as described above for example, the information processing device 100 can selectively switch and execute the above-described processing for the first operability improvement approach and processing for the second operability improvement approach. Accordingly, by the action determination unit 112 further determining whether or not the determined predetermined action is an action for performing processing cooperatively with the communication object device 300 as described above for example, user convenience and operability can be further improved.

The notification processing unit 114 has a leading role in notification processing the same as the processing of (IV) above (notification processing) relating to the first operability improvement approach. More specifically, in the event that determination has been made at the action determination unit 112 that a predetermined action has been performed, notification processing is performed to notify the user that determination has been made that a predetermined action has been performed.

Now, the notification processing unit 114 transmits a processing execution command to an external device via the communication unit 104, for notifying the external device that determination has been made that a predetermined action has been performed, as the notification processing, for example. By the above, the information processing device 100 can cause the display device 600 which is an external device, or the like, to perform visual notification such as shown in FIGS. 4 through 8, or audible notification, for example.

The notification processing at the notification processing unit 114 is not restricted to transmitting a processing execution command to an external device via the communication unit 104 for notifying the external device that determination has been made that a predetermined action has been performed. For example, in the event that the information processing device 100 has a display unit (described later), this display unit can be used to perform visual notification, and in the event that the information processing device 100 has an audio output unit (described later), this audio output unit can be used to perform audible notification. The above-described form will be described in a later-described third embodiment.

The cooperation determination unit 116 has a leading role in the processing of (iv) above (cooperation determination processing). More specifically, in the event of the action determination unit 112 determining that the user has performed a predetermined action in a set action region MA, the cooperation determination unit 116 determines whether or not to perform processing cooperatively with the communication object device 300, based on the cooperation control information. In the event of determining to perform processing cooperatively with the communication object device 300, for example, the cooperation determination unit 116 hands the determination results and the control information to the processing unit 118.

Now, in the event that the action determination unit 112 determines that a predetermined action has been performed, the cooperation determination unit 116 transmits the determination notification information to the communication object device 300 via the communication unit 104. By transmitting the determination notification information to the communication object device 300 as described above, the information processing device 100 can inform the communication object device 300 that determination has been made that the user has performed a predetermined action. Due to the above, the communication object device 300 (another information processing device 100) can notify the user of the communication object device 300 that the user of the information processing device 100 (which is a communication object device as viewed from the communication object device 300) has performed a predetermined action, as indicated by H in FIG. 10, for example. Also, due to the above, the communication object device 300 will transmit to the cooperation control server 200 determination notification information or a response to the effect that processing will not be performed cooperatively, as shown in step S106 in FIG. 9.

Also, in the event that cooperation control information is generated at the cooperation control server 200 by the processing shown in FIG. 9 being performed in the communication system 1000 for example, at the time of determination being made at the action determination unit 112 that a predetermined action has been performed, the cooperation determination unit 116 transmits the determination notification information to the cooperation control server 200. Also, in the event of the communication unit 104 receiving the determination notification information transmitted from the communication object device 300 before transmitting the determination notification information, the cooperation determination unit 116 transmits a response corresponding to the determination results at the action determination unit 112 to the cooperation control server 200. The cooperation determination unit 116 then performs the above-described determination based on the cooperation control information transmitted from the cooperation control server 200 which the communication unit 104 has received.

Note that the processing at the cooperation determination unit 116 is not restricted to determining whether or not to perform processing cooperatively with the cooperation control server 200, based on the cooperation control information generated by the communication object device 300. For example, the cooperation determination unit 116 may have a function for performing the processing of step S108 in FIG. 9 (cooperation control information generating processing), so as to generate cooperation control information. In the case above, the cooperation determination unit 116 transmits the generated cooperation control information to the communication object device 300, and determines whether or not to perform processing cooperatively with the communication object device 300 based on the generated cooperation control information. That is to say, in the above-described case, the cooperation determination unit 116 serves as the cooperation control server 200. Also, in a case where the communication object device 300 serves as the cooperation control server 200, for example, when receiving the cooperation control information generated by the communication object device 300 the cooperation determination unit 116 performs the above-described determination processing based on the cooperation control information which the communication unit 104 has received.

Also, in the event that the communication unit 104 receives the determination notification information transmitted form the communication object device 300, the cooperation determination unit 116 performs notification processing to notify the user that determination has been made that a predetermined action has been performed at the communication object device 300. Now, the cooperation determination unit 116 performs processing to visually notify the user by changing the image displayed on the display screen as indicated by H in FIG. 10 for example, as notification processing, but the processing is not restricted to the above-described. For example, the cooperation determination unit 116 can perform processing for audibly notifying the user, such as outputting from an audio output device of its own (e.g., a later-described audio output unit) or external audio output device, in the same way as with the notification processing at the notification processing unit 114, as notification processing. Also, the cooperation determination unit 116 may hand a notification processing execution command to the notification processing unit 114 for example, so as to cause the notification processing unit 114 to perform processing for visual notification or audible notification.

The processing unit 118 has a leading role in the processing of (v) above (execution processing), and selectively performs processing based on the cooperation control information as processing corresponding to the predetermined action determined at the action determination unit 112, based on the determination results at the cooperation determination unit 116.

More specifically, upon determination being made at the cooperation determination unit 116 to perform processing cooperatively with the communication object device 300, the processing unit 118 performs processing based on the cooperation control information, as processing corresponding to the predetermined action determined at the action determination unit 112. Also, in the event that determination is not made at the cooperation determination unit 116 to perform processing cooperatively with the communication object device 300, the processing unit 118 does not perform processing corresponding to the predetermined action determined at the action determination unit 112. Accordingly, due to the processing unit 118 selectively performing processing based on the cooperation control information, based on determination results at the cooperation determination unit 116, an undesirable situation can be prevented from occurring due to processing corresponding to a user action being performed at one information processing device of the information processing devices that are performing communication, such as described above. Note that in the event that the processing unit 118 is not going to perform processing corresponding to the predetermined action determined at the action determination unit 112, the processing unit 118 may perform notification processing visually or audibly to the user to the effect that this will not be performed, for example.

Also, in the event of being handed determination results indicating that a predetermined action has been performed from the action determination unit 112, the processing unit 118 performs processing corresponding to the predetermined action determined at the action determination unit 112 (processing relating to the first operability improvement approach described above), based on the processing information 172 for example. Now, predetermined actions and processing to be executed for example, are recorded in the processing information 172 in a correlated manner. Accordingly, by using the processing information 172 in which processing correlated with the meaning of the predetermined action has been recorded, the information processing device 100 can perform processing correlated to the meaning of the detected action (processing taking affordance into consideration).

Also, the processing unit 118 can transmit a processing execution command to cause an external device to perform processing corresponding to the predetermined action via the communication unit 104, as processing corresponding to the predetermined action. Accordingly, the information processing device 100 can cause the display device 600 which is an external device, or the like, to perform processing corresponding to the detected predetermined action.

Also, the processing unit 118 may perform processing such as recording recognition information in the storage unit 102, transmitting the recognition information 174 stored at the storage unit 102 to an external device such as a server (not shown) via the communication unit 104, and so forth, for example.

With the configuration shown in FIG. 18, the information processing device 100 according to the first embodiment can realize the processing of (i) (face region detection processing) through the processing of (v) (execution processing) described above according to the second operability improvement approach. Accordingly, the information processing device 100 can prevent deterioration of user convenience in the communication system 1000 and improve user operability, by the configuration shown in FIG. 18 for example.

Modification of Information Processing Device 100 According to First Embodiment Note that the configuration of the information processing device 100 according to the first embodiment of the present disclosure is not restricted to the configuration shown in FIG. 18. For example, the information processing device 100 according to the first embodiment may further have a device for realizing processing correlated with the meaning of a predetermined action performed by the user, such as an audio output device or the like, a device relating to cooperative processing with a communication object device 300, and so forth. Also, the information processing device 100 according to the first embodiment may be arranged not having the storage unit 102 but rather obtaining information used for processing such as the reference detection information 170 and processing information 172 from an external device as appropriate, so as to perform processing.

Second Embodiment

FIG. 20 is a block diagram illustrating an example of the configuration of an information processing device according to a second embodiment of the present disclosure. In FIG. 20, the cooperation control server 200, communication object device 300, . . . , and display system 500 are shown together, as with FIG. 18.

The information processing device 100 according to the second embodiment shown in FIG. 20 has basically the same configuration as the information processing device 100 according to the first embodiment shown in FIG. 18, but the information processing device 100 according to the second embodiment further is provided with a learning unit 120 as compared to the information processing device 100 according to the first embodiment shown in FIG. 18.

The learning unit 120 serves to manage individual detection information. For example, in the event of determination being made at the action determination unit 112 that a predetermined action has been performed, the learning unit 120 updates the individual detection information corresponding to the determined predetermined action and the face information extracted form the action region setting unit 110. More specifically, the learning unit 120 takes the information of the periodic component detected at the action determination unit 112, for example, as periodic component information in the individual detection information corresponding to the determined predetermined action and the face information extracted by the action region setting unit 110.

Note that the learning unit 120 is not restricted to performing updating of individual detection information in a case of determination being made at the action determination unit 112 that a predetermined action has been made, and for example, may perform updating of individual detection information in the event that determination is made at the action determination unit 112 that a predetermined action has been performed continuously for a predetermined period. Also, in the event that the detecting unit 108 has a function for detecting periodic components in the action regions MA, the learning unit 120 may take the periodic component information handed from the detecting unit 108 as periodic component information in the individual detection information.

Now, in the event that determination is made at the action determination unit 112 that a predetermined action has been performed (or in the event that determination is made that a predetermined action has been continuously performed for a predetermined period), the learning unit 120 can automatically update the individual detection information, but the processing at the learning unit 120 is not restricted to the above-described. For example, the learning unit 120 can selectively update individual detection information based on operating signals corresponding to user operations that are sent form an operating unit (not shown) or external operating signals transmitted from an external operating device such as a remote controller or the like.

Note that the management of individual detection information at the learning unit 120 is not restricted to updating periodic component information in the individual detection information described above. For example, the learning unit 120 can manage information unique to the user, such as information relating to adjustment of region size of the action regions MA and adjustment of position thereof, information of the period for determining the predetermined action of the user, and so forth, as individual detection information. Also, the learning unit 120 can generate or update individual detection information based on operating signals sent from an operating unit (not shown) in accordance with user operations by way of a user interface for learning for example, regardless of the determination results from the action determination unit 112.

The information processing device 100 according to the second embodiment has basically the same configuration as the information processing device 100 according to the first embodiment shown in FIG. 18. Accordingly, the information processing device 100 according to the second embodiment can realize the processing of (i) (face region detection processing) through the processing of (v) (execution processing) described above, according to the second operability improvement approach with the configuration shown in FIG. 20, in the same way as with the information processing device 100 according to the first embodiment. Accordingly, the information processing device 100 according to the second embodiment can prevent deterioration in user convenience in the communication system 1000, and improve user operability, with the configuration shown in FIG. 20, for example.

Also, by having the learning unit 120, the information processing device 100 according to the second embodiment can manage information according to unique conditions of the user, such as for example, age, gender, physical features, and so forth, as individual detection information. Now, as described with reference to FIGS. 13 and 14, the information processing device 100 prevents erroneous detection and excessive detection of actions of a particular user corresponding to the face information included in the individual detection information, by detecting that a predetermined action has been performed using individual detection information. Accordingly, due to the learning unit 120 managing individual detection information, the information processing device 100 can improve the precision of determination in the event of determining actions of a particular user corresponding to individual detection information.

Modification of Information Processing Device 100 According to Second Embodiment Note that the configuration of the information processing device 100 according to the second embodiment of the present disclosure is not restricted to the configuration shown in FIG. 20. For example, the information processing device 100 according to the second embodiment may further have a device for realizing processing correlated with the meaning of a predetermined action performed by the user, a device relating to cooperative processing with a communication object device 300, and so forth, as with the case of the modification of the information processing device 100 according to the first embodiment. Also, the information processing device 100 according to the second embodiment may obtain information used for processing such as the reference detection information 170 and processing information 172 from an external device such as a server as appropriate, so as to perform processing, in the same way as with the information processing device 100 according to the first embodiment.

Third Embodiment

In the above description, a configuration has been illustrated as an information processing device 100 according to the first embodiment and an information processing device 100 according to the second embodiment, with the imaging apparatus 700 (e.g., external device) of the display system 500 processing generated imaged images. However, the configuration of the information processing device 100 according to an embodiment of the present disclosure is not restricted to a configuration where an external device processes generated imaged images.

Figure 21:
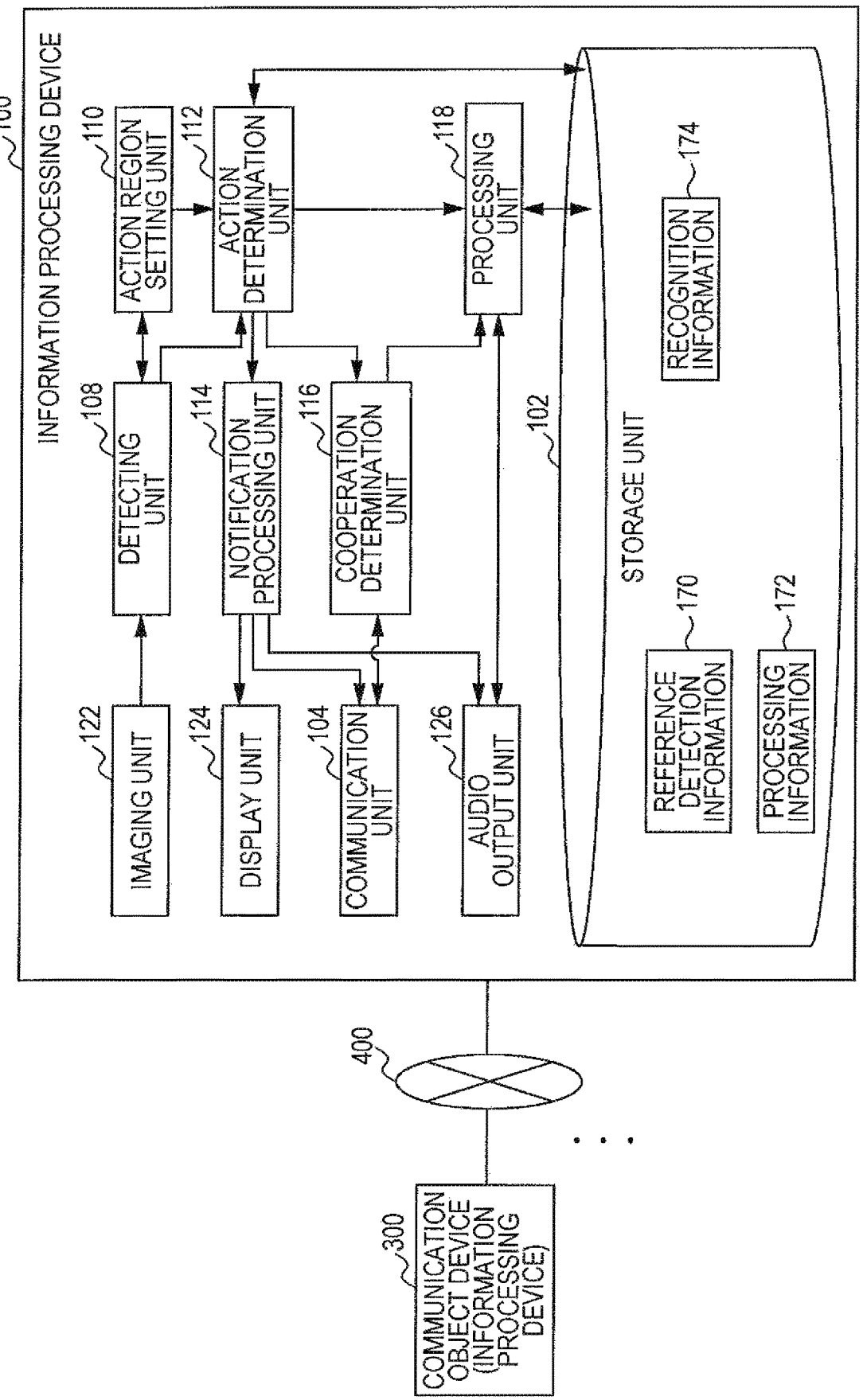
FIG. 21 is a block diagram illustrating an example of the configuration of an information processing device according to a third embodiment of the present disclosure.

FIG. 21 is a block diagram illustrating an example of the configuration of an information processing device 100 according to a third embodiment of the present disclosure.

The information processing device 100 according to the third embodiment of the present disclosure shown in FIG. 21 has basically the same configuration as the information processing device 100 according to the first embodiment shown in FIG. 18, but the information processing device 100 according to the third embodiment further is provided with an imaging unit 122, a display unit 124, and an audio output unit 126 as compared to the information processing device 100 according to the first embodiment shown in FIG. 18.

The imaging unit 122 which the information processing device 100 has generates imaged images by imaging in the display direction of the display screen displayed on the display unit 124. The imaging unit 122 sends imaged images to the detecting unit 108. By the imaging unit 122 generating of imaged images by imaging in the display direction of the display screen, an imaged image imaging the user watching the display screen is obtained. Accordingly, the information processing device 100 can easily perform the processing of (i) (face region detection processing) through (v) (execution processing) described above, such as identifying of the face region FA, setting of action regions MA, detection of predetermined actions of the user, extracting facial expressions, and so forth, for example.

Also, the imaging unit 122 is configured of one or two or more imaging devices configured of a lens/imaging device and signal processing circuit for example, but the configuration of the imaging unit 122 is not restricted to the above-described.

The display unit 124 which the information processing device 100 has displays various information and images on the display screen. Examples of screens displayed on the display screen of the display unit 124 include a content display screen for displaying contents, a screen for displaying imaged images generated by the imaging unit 122 (may be superimposed with contents), a screen relating to a video call such as shown in FIG. 10, an operating screen for allowing desired actions to be performed as to the information processing device 100, and so forth.

The audio output unit 126 which the information processing device 100 has outputs various audio such as audio indicated by contents, or system audio at the information processing device 100, for example. By having the audio output unit 126, the information processing device 100 can perform muting of audio and volume adjustment of audio output from the audio output unit 126 for example, as processing corresponding to predetermined actions of the user which the processing unit 118 performs.

Also, examples of the audio output unit 126 include an audio output device configured of a DSP, and amplifier (amp) and speakers and the like, but the configuration of the audio output unit 126 is not restricted to the above-described.

The information processing device 100 according to the third embodiment of the present disclosure has basically the same configuration as the information processing device 100 according to the first embodiment shown in FIG. 18. Accordingly, the information processing device 100 according to the third embodiment can realize the processing of (i)

(face region detection processing) through the processing of (v) (execution processing) described above relating to the second operability improvement approach with the configuration shown in FIG. 21, in the same way as the information processing device 100 according to the first embodiment. Accordingly, the information processing device 100 according to the third embodiment can prevent deterioration in user convenience in the communication system 1000, and improve user operability, with the configuration shown in FIG. 21, for example.

Modification of Information Processing Device 100 According to Third Embodiment The configuration of the information processing device 100 according to the third embodiment of the present disclosure is not restricted to the configuration shown in FIG. 21. For example, the information processing device 100 according to the third embodiment may have the learning unit 120 in the same way as with the information processing device 100 according to the second embodiment. Also, the information processing device 100 according to the third embodiment may be of a configuration not having the audio output unit 126 for example, or may further have a device for realizing processing correlated to the meaning of predetermined actions of the user or devices relating to processing performed cooperatively with a communication object device 300. Further, the information processing device 100 according to the third embodiment may be of a configuration which obtains information used for processing such as reference detection information 170 and processing information 172 from an external device such as a server as appropriate, and performs processing, in the same way as with the modification of the information processing device 100 according to the first embodiment.

As described above, the information processing device 100 according to an embodiment of the present disclosure performs the processing of (1) (face region detection processing) through the processing of (4) (execution processing) described above relating to the first operability improvement approach, or the processing of (I) (face region detection processing) through the processing of (V) (execution processing) described above relating to the first operability improvement approach, or, the processing of (i) (face region detection processing) through the processing of (v) (execution processing) described above relating to the second operability improvement approach, thereby determining that a predetermined action has been performed by the user, and performing processing corresponding to the determined predetermined action. Now, the information processing device 100 sets action regions MA nearby the face region FA identified based on the imaged image, detects (determines) predetermined actions of the user in the set action regions MA, and performs processing corresponding to the detected predetermined actions. By setting the action regions MA in this way, the information processing device 100 can detect actions of the user by performing image processing on a part of the regions in the imaged image, rather than performing image processing on the entire imaged image as with information processing device according to the related arts. Thus, the information processing device 100 can reduce the calculation burden relating to detection of predetermined actions of the user as compared to information processing device according to the related arts, so with the information processing device 100, so occurrence of undesirable situations which can happen with information processing device according to the related arts, such as the user being made to wait for an unreasonable amount of time, or functions other than user interface not being realized, for example, can be prevented. Accordingly, the information processing device 100 can prevent deterioration in user convenience can occur in the case of using a technique according to the related art, and also can improve user operability.

Also, the information processing device 100 performs processing corresponding to a predetermined action detected in an action region MA set nearby the face region FA, so erroneous detection of predetermined actions performed by people or objects other than the user corresponding to the face region FA for example, can be reduced as compared to information processing device according to the related arts which take the entire imaged image and the object of processing. Accordingly, the information processing device 100 can further improve user operability as compared to information processing device according to the related arts.

The information processing device 100 performs processing correlated with the meaning of the predetermined actions, as processing corresponding to the predetermined actions detected at the action regions MA set nearby the face region FA. As described above, due to the information processing device 100 performing processing correlated with the meaning of the detected actions (processing taking affordance into consideration), the chance that the user will sense inconsistency between the user's own actions and the processing which the information processing device 100 performs (or processing which the information processing device 100 causes an external device to perform) can be further reduced. Accordingly, the information processing device 100 can further improve user operability.

Also, in the event of determining that a predetermined operation has been performed (in the event that a predetermined action has been detected), the information processing device 100 can further perform notification processing in which the user is notified that determination has been made at the information processing device 100 that a predetermined action has been performed. Also, in the event of performing notification processing, in a case of determination having been made that a predetermined action has been continuously performed for a predetermined period from determination having been made that the predetermined action has been performed, the information processing device 100 performs processing corresponding to the predetermined action that has been determined. Now, by the information processing device 100 performing notification processing, the user can be made to comprehend that the action which the user has performed has been recognized by the information processing device 100, so the user can cancel execution of the processing corresponding to this action at the information processing device 100 by quitting his/her own action. Accordingly, in the event the user desires to cancel execution of processing corresponding to the action at the information processing device 100 after the user has performed the predetermined action and the information processing device 100 has recognized this, or even in the event that the information processing device 100 has happened to erroneously detect an action which the user has performed, for example, the user can control executing of processing at the information processing device 100 corresponding to this action, by his/her own action.

Accordingly, by performing notification processing and further selectively performing processing corresponding to a predetermined action determined in the event that determination has been made that the predetermined action has bee continuously performed for a predetermined period, the information processing device 100 can prevent processing unintended by the user from being executed due to erroneous detection, and accordingly can further improve user convenience and operability.

Further, in the event of performing processing relating to the second operability improvement approach, in the event of not determining to perform processing cooperatively with a communication object device, even if determination is made that the user has performed a predetermined action, the information processing device 100 does not perform processing corresponding to the predetermined action that has been determined. Accordingly, by performing processing relating to the second operability improvement approach, an undesirable situation can be prevented from occurring due to processing corresponding to a user action being performed at one information processing device of the information processing devices that are performing communication, such as described above. Accordingly, by performing processing relating to the second operability improvement approach, the information processing device 100 can prevent deterioration in user convenience in the communication system 1000, and improve user operability.

While description has been made with the information processing device 100 as an embodiment of the present disclosure, embodiments of the present disclosure are not restricted to this form. Embodiments of the present disclosure can be applied to various devices, such as for example, computers such as PCs and servers, display devices such as television receivers and signage devices, portable communication devices such as cellular phones, video/audio players (or video/audio recorder-players), game devices, and so forth.

Also, while description has been made with the cooperation control server 200 as an embodiment of the present disclosure, embodiments of the present disclosure are not restricted to this form. Embodiments of the present disclosure can be applied to various devices, such as for example, computers such as PCs and servers, and so forth.

Also, while description has been made with the display system 500 as an embodiment of the present disclosure, embodiments of the present disclosure are not restricted to this form. Embodiments of the present disclosure can be applied to various devices capable of displaying and imaging, such as for example, computers such as PCs, display devices such as television receivers and signage devices, portable communication devices such as cellular phones, and so forth. Note that the display system 500 according to an embodiment of the present disclosure may be a combination of a device which performs display and a device which performs imaging.

3. Program According to Embodiment of Present Disclosure

User operability can be improved by a program for causing a computer to function as an information processing device according to an embodiment of the present disclosure (a program for realizing, for example, the processing of (1) (face region detection processing) through the processing of (4) (execution processing) described above relating to the first operability improvement approach, a program for realizing the processing of (I) (face region detection processing) through the processing of (V) (execution processing) described above relating to the first operability improvement approach, or a program for realizing the processing of (i) (face region detection processing) through the processing of (v) (execution processing) described above relating to the second operability improvement approach).

While preferred embodiments of the present disclosure have been described with reference to the attached drawings, It goes without saying that the present disclosure is not restricted to these examples. It will be apparent to one skilled in the art that various alterations and modifications can be made within the scope of the Claims, which are encompassed by the technical scope of the present disclosure as a matter of course.

For example, in FIGS. 18 through 21, an example has been shown where the information processing device 100 according to the first through third embodiments of the present disclosure (including modifications) separately have the detecting unit 108, action region setting unit 110, action determination unit 112, notification processing unit 114, cooperation determination unit 116, and processing unit 118, but the configuration of the information processing device according to an embodiment of the present disclosure is not restricted to the above-described. For example, the information processing device according to an embodiment of the present disclosure may have the detecting unit 108, action region setting unit 110, action determination unit 112, notification processing unit 114, cooperation determination unit 116, and processing unit 118, formed as a single component (e.g., realized with a single processing circuit). Also, the information processing device may have optional components integrated, such as for example, the detecting unit 108 and the action region setting unit 110 formed as a single component (e.g., an image processing unit realized with a single image processing circuit), and so forth. Further, the information processing device may separately have an information storage unit (not shown) for performing recording of recognition information, for example.

Also, while in the above description, an illustration has been made of a program for causing a computer to function as an information processing device according to an embodiment of the present disclosure (computer program) being provided, an embodiment of the present disclosure may further provide a storage medium in which the above-described program has been stored, therewith.

The above-described configurations are an illustration of an example of an embodiment of the present disclosure, and belong to the technical scope of the present disclosure, as a matter of course.

It should be understood by those skilled in the art that various modifications, combinations, sub-combinations and alterations may occur depending on design requirements and other factors insofar as they are within the scope of the appended claims or the equivalents thereof.

What is claimed is:

1. A processing device, comprising:
at least one processor configured to control detecting a face region of an image, setting at least one action region according to a position of the face region, comparing image data corresponding to the at least one action region to detection information for purposes of determining whether or not a given action has been performed, and executing a given processing based on cooperation control information when it is determined that the given action has been performed and the cooperation control information is obtained by the device,
wherein the comparing image data corresponding to the at least one action region to the detection information for purposes of determining whether or not a given action has been performed comprises extracting face information from the face region and determining whether or not there is individual detection information corresponding to the face information, and when there is individual detection information corresponding to the face information comparing image data corresponding to the at least one action region to the individual detection information for purposes of determining whether or not a given action has been performed, in which the at least one processor is configured to re-set the at least one action region, by adjusting at least one of size or position of the at least one action region according to given information indicated by the face region.

2. A processing device as recited in claim 1, wherein the at least one processor is configured to control transmitting a determination notification information when it is determined that the given action has been performed.

3. A processing device as recited in claim 2, wherein the at least one processor is configured to control transmitting the determination notification information when it is determined that the given action has been performed for a given period of time.

4. A processing device as recited in claim 2, wherein the processing device obtains the cooperation control information after transmitting the determination notification information.

5. A processing device as recited in claim 1, wherein the at least one processor is configured to control generating a notification when it is determined that the given action has been performed.

6. A processing device as recited in claim 5, wherein the notification is a visual notification.

7. A processing device as recited in claim 6, wherein the notification comprises displaying the image on a display screen.

8. A processing device as recited in claim 7, wherein the notification comprises superimposing a notification object on the at least one action region.

9. A processing device as recited in claim 7, wherein the notification comprises masking a portion of the image.

10. A processing device as recited in claim 6, wherein the notification comprises displaying an icon on another image displayed on a display screen.

11. A processing device as recited in claim 6, wherein the notification comprises changing a state of a lighting device provided on an outer portion of a display screen.

12. A processing device as recited in claim 5, wherein the notification is an audio notification.

13. A processing device as recited in claim 1, wherein the given action corresponds to a periodic component of the image.

14. A processing device as recited in claim 13, wherein the comparing image data corresponding to the at least one action region to the detection information comprises detecting whether or not the periodic component is present in the at least one action region and detecting whether or not the detection information correlates the periodic component to the given action.

15. A processing method, comprising:
detecting a face region of an image, setting at least one action region according to a position of the face region, re-setting the at least one action region by adjusting at least one of size or position of the at least one action region according to given information indicated by the face region, comparing image data corresponding to the at least one action region to detection information for purposes of determining whether or not a given action has been performed, and executing a given processing based on cooperation control information when it is determined that the given action has been performed and the cooperation control information is obtained by the device storing detection information, wherein the comparing image data corresponding to the at least one action region to the detection information for purposes of determining whether or not a given action has been performed comprises extracting face information from the face region and determining whether or not there is individual detection information corresponding to the face information, and when there is individual detection information corresponding to the face information comparing image data corresponding to the at least one action region to the individual detection information for purposes of determining whether or not a given action has been performed; and transmitting determination notification information when it is determined that the given action has been performed.

16. A processing method as recited in claim 15, further comprising:
transmitting the determination notification information when it is determined that the given action has been performed for a given period of time.

17. A processing method as recited in claim 16, further comprising:
obtaining the cooperation control information after transmitting the determination notification information.

18. A processing method as recited in claim 15, further comprising:
generating a notification when it is determined that the given action has been performed.

19. A processing method as recited in claim 18, wherein the notification is a visual notification.

20. A processing method as recited in claim 19, wherein the notification comprises displaying the image on a display screen.

21. A processing method as recited in claim 20, wherein the notification comprises superimposing a notification object on the at least one action region.

22. A processing method as recited in claim 20, wherein the notification comprises masking a portion of the image.

23. A processing method as recited in claim 19, wherein the notification comprises displaying an icon on another image displayed on a display screen.

24. A processing method as recited in claim 19 wherein the notification comprises changing a state of a lighting device provided on an outer portion of a display screen.

25. A processing method as recited in claim 18, wherein the notification is an audio notification.

26. A processing method as recited in claim 16, wherein the given action corresponds to a periodic component of the image.

27. A processing method as recited in claim 26, wherein the comparing image data corresponding to the at least one action region to the detection information comprises detecting whether or not the periodic component is present in the at least one action region and detecting whether or not the detection information correlates the periodic component to the given action.

28. A processing device of claim 1, wherein the given information indicated by the face region includes at least one of an attribute of a user estimated from image processing on the face region or information from a storage indicating a user operation relating to action region adjustment.

29. A non-transitory recording medium configured to store a program executable by a computer, the program comprising:

detecting a face region of an image, setting at least one action region according to a position of the face region, re-setting the at least one action region by adjusting at least one of size or position of the at least one action region according to given information indicated by the face region, comparing image data corresponding to the at least one action region to detection information for purposes of determining whether or not a given action has been performed, and executing a given processing based on cooperation control information when it is determined that the given action has been performed and the cooperation control information is obtained by the device storing detection information, wherein the comparing image data corresponding to the at least one action region to the detection information for purposes of determining whether or not a given action has been performed comprises extracting face information from the face region and determining whether or not there is individual detection information corresponding to the face information, and when there is individual detection information corresponding to the face information comparing image data corresponding to the at least one action region to the individual detection information for purposes of determining whether or not a given action has been performed; and transmitting determination notification information when it is determined that the given action has been performed.

* * * * *